（12）United States Patent
Nagatani et al.

(10) Patent No.: US 12,276,974 B2
(45) Date of Patent: Apr. 15, 2025

(54) CONTROL COORDINATION SYSTEM

(71) Applicant: Mitsubishi Electric Corporation, Tokyo (JP)

(72) Inventors: Tatsuya Nagatani, Tokyo (JP); Marina Kousaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 412 days.

(21) Appl. No.: 17/785,053

(22) PCT Filed: Feb. 10, 2020

(86) PCT No.: PCT/JP2020/005025
§ 371 (c)(1),
(2) Date: Jun. 14, 2022

(87) PCT Pub. No.: WO2021/161357
PCT Pub. Date: Aug. 19, 2021

(65) Prior Publication Data
US 2023/0004147 A1 Jan. 5, 2023

(51) Int. Cl.
G05B 19/418 (2006.01)
(52) U.S. Cl.
CPC ............ G05B 19/41865 (2013.01); G05B 2219/31261 (2013.01)
(58) Field of Classification Search
None
See application file for complete search history.

(56) References Cited

U.S. PATENT DOCUMENTS 5,825,981 A 10/1998 Matsuda
10,423,152 B2 * 9/2019 Kanemaru ....... G05B 19/41855
(Continued)

FOREIGN PATENT DOCUMENTS

CN 101978389 B * 7/2014
JP 9-244730 A 9/1997
(Continued)

OTHER PUBLICATIONS

International Search Report and Written Opinion mailed on Apr. 14, 2020, received for PCT Application PCT/JP2020/005025, filed on Feb. 10, 2020, 9 pages including English Translation.
(Continued)

Primary Examiner — Hien D Khuu
(74) Attorney, Agent, or Firm — XSENSUS LLP

(57) ABSTRACT

Control of a facility is performed in accordance with a common action plan. Further, a plurality of controllers provided in the facility are caused to control the facility in coordination. A control coordination apparatus includes a control information generation unit and a control information transmission unit. The control information generation unit generates control data which include information for specifying a control content of the facility to be controlled by the plurality of controllers and are received by each of the controllers, from an action plan file which includes an action plan made by an action plan generation apparatus and is generated by the action plan generation apparatus. The control information transmission unit transmits the control data to each of the controllers on the basis of facility design information including information on connection with the facility.

10 Claims, 11 Drawing Sheets

(56) References Cited

U.S. PATENT DOCUMENTS

2004/0133310 A1    7/2004  Watanabe et al.
2011/0288667 A1*  11/2011  Noda ..................... G05B 19/42
                                                        700/98

FOREIGN PATENT DOCUMENTS

| JP | 11-306233 A | 11/1999 |
| JP | 2000-117593 A | 4/2000 |
| JP | 2003-9257 A | 1/2003 |
| JP | 2004-185228 A | 7/2004 |
| WO | 2017/090141 A1 | 6/2017 |
| WO | WO_2017090141 A1 * | 6/2017 |

OTHER PUBLICATIONS

Notice of Reasons for Refusal mailed on Sep. 8, 2020, received for JP Application 2020-537032, 8 pages Including English Translation.

* cited by examiner

F I G. 1 0
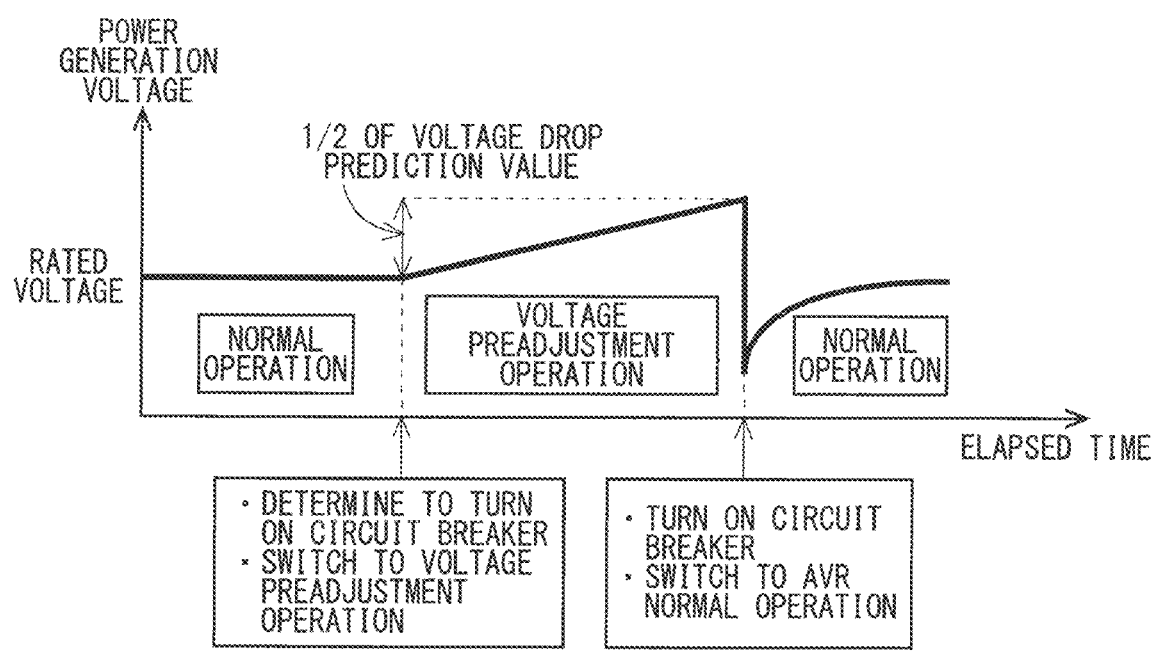

CONTROL COORDINATION SYSTEM

CROSS-REFERENCE TO RELATED APPLICATION

The present application is based on PCT filing PCT/JP2020/005025, filed Feb. 10, 2020, the entire contents of which are incorporated herein by reference.

TECHNICAL FIELD

The present disclosure relates to a control coordination system including the control coordination apparatus.

BACKGROUND ART

In many cases, a production facility includes a controller which controls the production facility.

Further, in recent years, the techniques on action plans have advanced markedly. For this reason, it is desired that the techniques on action plans should be used for controlling a production facility.

In a production cell disclosed in Patent Document 1, an information processing device transmits work unit instruction information to work execution elements. Further, the work execution elements transmit respective execution-enabled notifications back thereto. Further more, the information processing device selects one of the work execution elements which output the execution-enabled notifications and gives an execution command thereto (summary).

PRIOR ART DOCUMENTS

Patent Documents

[Patent Document 1] Japanese Patent Application Laid-Open No. 2004-185228

SUMMARY

Problem to be Solved by the Invention

In order to use the techniques on action plans to control the production facility, however, it is necessary to give a function of controlling the production facility in accordance with a common action plan to the controller which controls the production facility.

Even in a case where it is possible to give the function to the controllers which control the production facility, however, when a plurality of controllers which control the production facility include controllers manufactured by different makers or controllers for different uses, it is impossible to commonalize the functions to be given to the plurality of controllers in some cases. For this reason, in some cases, it is impossible to cause the plurality of controllers to control the production facility in coordination.

These problems also occur in a case where any one of facilities other than the production facility is controlled.

The present disclosure is intended to solve these problems. It is an object of the present disclosure to perform a control of a facility in accordance with a common action plan without giving a function of performing the control of the facility in accordance with the common action plan to controllers included in the facility. Further, it is another object of the present disclosure to cause a plurality of controllers included in the facility to perform a control of the facility in coordination.

Means to Solve the Problem

A control coordination system includes a control coordination apparatus and a action plan generation apparatus.

The control information generation unit generates control data which include information for specifying a control content of a facility to be controlled by a plurality of controllers and are received by each of the controllers, from an action plan file which includes an action plan made by an action plan generation apparatus and is generated by the action plan generation apparatus.

The control information transmission a it transmits the control data to each of the controllers on the basis of facility design information including information on connection with the facility.

Effects of the Invention

According to the present disclosure, it is possible to perform a control of a facility in accordance with a common action plan without giving a function of performing the control of the facility in accordance with the common action plan to controllers. Further, it is also possible to cause the controllers to perform the control of the facility in coordination.

These and other objects, features, aspects and advantages of the present invention will become more apparent from the following detailed description of the present invention when taken in conjunction with the accompanying drawings.

BRIEF DESCRIPTION OF DRAWINGS

FIG. 10 is a graph showing an exemplary action plan made by an action plan generation apparatus included in the power generation system in accordance with the fifth preferred embodiment.

DESCRIPTION OF EMBODIMENT(S)

1 The First Preferred Embodiment

Figure 1:
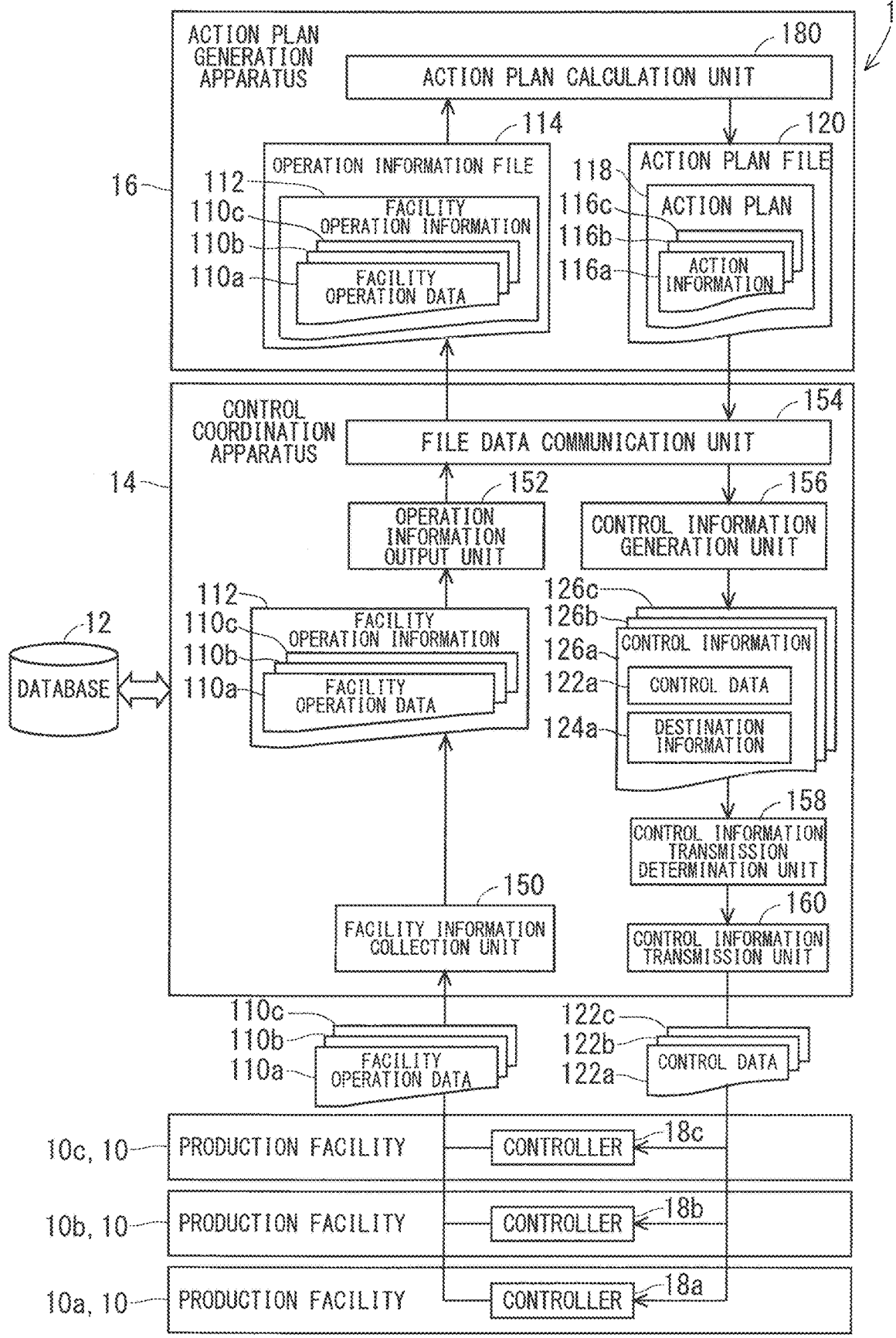
FIG. 1 is a block diagram schematically showing a production system in accordance with a first preferred embodiment.

1.1 Use of Techniques on Action Plans in Production System

In many cases, a production facility includes a dedicated controller which exclusively controls the production facility. While the production facility performs production activities, the dedicated controller controls the production facility by repeatedly executing a control program for production activity, which is stored in the dedicated controller in advance. Further, the dedicated controller sometimes controls the production facility by executing a dedicated control program stored in the dedicated controller in advance in a case where the production facility fails an operation, where changeover for changing the product type to be produced by the production facility is performed, or the like case.

Furthermore, in order to manage a series of production activities performed by a plurality of production facilities in cooperation, in some cases, adopted is a manufacturing execution system (MES) which transmits a manufacturing instruction to the dedicated controller which controls each of the production facilities. The series of production activities include the changeover. In many cases, the dedicated controller for controlling each of the production facilities, which is controlled by the MES, also controls each production facility by executing the control program stored in the dedicated controller in advance.

On the other hand, in recent years, the techniques on action plans have advanced markedly. For example, since both an algorithm and an information equipment for making and managing an action plan have advanced, in various fields such as image recognition, voice recognition, parameter adjustment, combinatorial optimization, anomaly detection, and the like, it is becoming possible to make and manage an action plan for solving the problems by using artificial intelligence (AI) and Big Data, or the like. For this reason, it is desired that the techniques on action plans should be used in a production system.

Further, there are increasing cases where the destination to which a function of making and managing the action plan is given is changed from the dedicated controller provided in the production facility, a personal computer (PC), or the like to an information equipment having high computational processing power, such as a server installed inside a plant where the production facility is located, an edge located inside the plant, a cloud set up outside the plant, or the like.

In the use of advanced techniques on action plans in an actual production system, however, there remains a problem that a high integration cost is needed therefor. This is because there are a limited number of engineers familiar with developments in various platforms where the techniques on action plans are developed. Further, this is also because there are a limited number of engineers who can design a production system since data communicated with the dedicated controller which controls the production facility are different depending on the maker which manufactures the dedicated controller or the use of the dedicated controller. Furthermore, this is still also because there are a limited number of engineers familiar with both the techniques on action plans and the data communicated with the dedicated controller which controls the production facility though this familiarity is needed in order to design a production system having both a function of making and managing an action plan and a function of communicating with the dedicated controller which controls the production facility.

Then, a technique will be disclosed below, which makes it possible to fill a gap between an engineer who constructs a system on an action plan and another engineer who constructs a production facility, to achieve bridging between the action plan and a production system, and to easily construct the production system in which the system on the action plan and the production facility are coordinated with each other.

1.2 Outline of Production System

Figure 2:
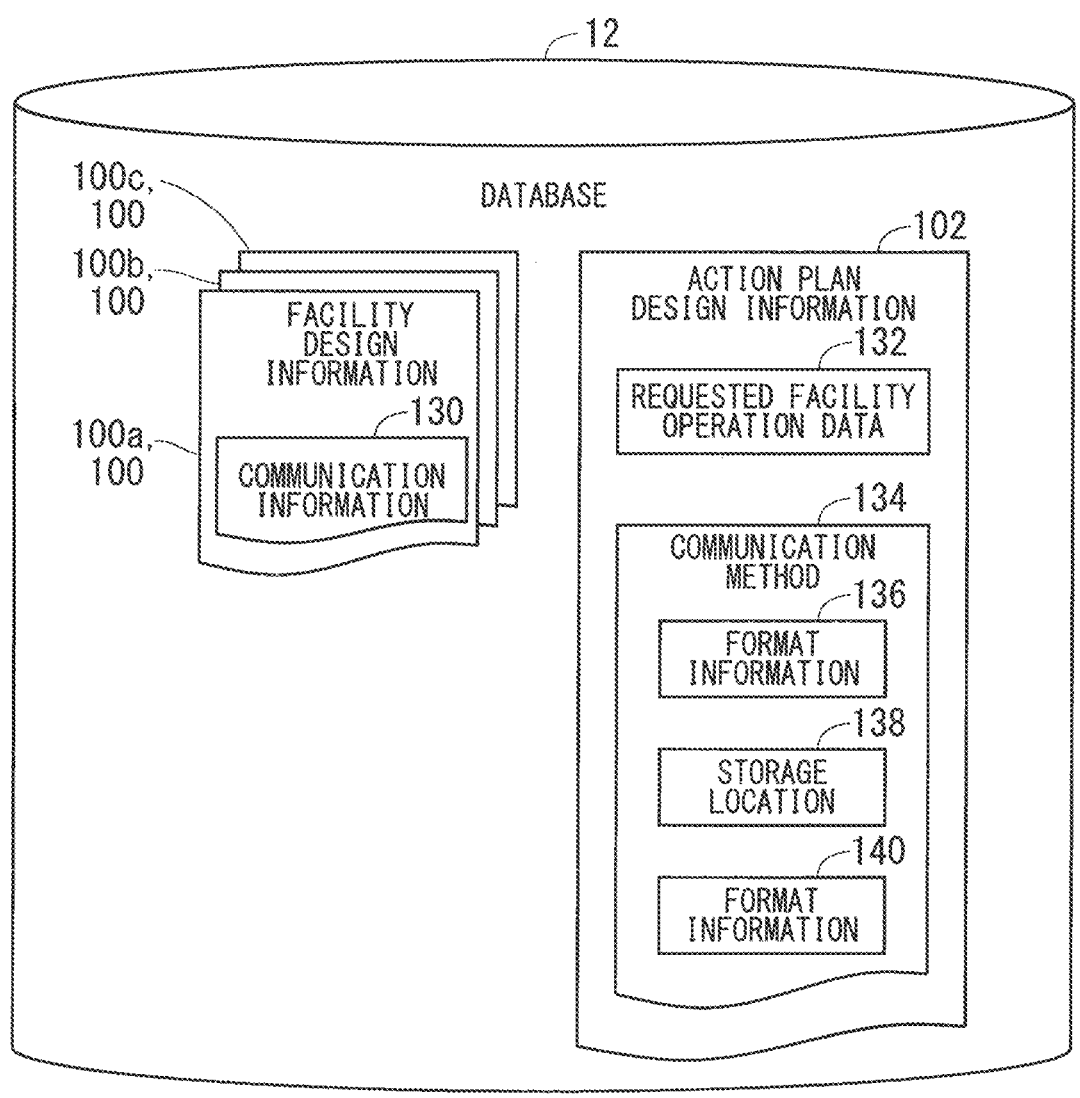
FIG. 2 is a view schematically showing a database included in the production system in accordance with the first preferred embodiment.

FIG. 1 is a block diagram schematically showing a production system in accordance with the first preferred embodiment. FIG. 2 is a view schematically showing a database included in the production system in accordance with the first preferred embodiment.

A production system 1 of the first preferred embodiment r is a system for performing a prod u c don.

As shown in FIG. 1, the production system 1 includes a plurality of production facilities 10a, 10b, and 10c, a database 12, a control coordination apparatus 14, and an action plan generation apparatus 16. In the first preferred embodiment, the production system 1 includes three production facilities 10a, 10b, and 10c. The production system 1 may include, however, two facilities or less, or four facilities or more.

As shown in FIG. 1, the plurality of production facilities 10a, 10b, and 10c include a plurality of controllers 18a, 18b, and 18c, respectively. In the first preferred embodiment, each production facility 10 among the plurality of production facilities 10a, 10b, and 10c includes one controller. Each production facility 10, however, may include two or more controllers.

As shown in FIG. 2, the database 12 stores therein a plurality of pieces of facility design information 100a, 100b, and 100c and action plan design information 102.

The control coordination apparatus 14 is communicably connected to the plurality of controllers 18a, 18b, and 18c. The control coordination apparatus 14 can thereby directly communicate with the plurality of controllers 18a, 18b, and 18c. Further, in the first preferred embodiment, the control coordination apparatus 14 is communicably connected to the action plan generation apparatus 16. The control coordination apparatus 14 can thereby directly communicate with the action plan generation apparatus 16. The control coordination apparatus 14, however, may indirectly communicate with the action plan generation apparatus 16 through a file server or the like. Further, the control coordination apparatus 14 can refer to a plurality of pieces of facility design information 100a, 100b, and 100c and action plan design information 102, which are stored in the database 12.

The plurality of production facilities 10a, 10b, and 10c are facilities for performing a production. Each production facility 10 performs a production activity assigned to the production facility 10.

The plurality of controllers 18a, 18b, and 18c perform a control of the plurality of production facilities 10a, 10b, and 10c, respectively. The plurality of controllers 18a, 18b, and 18c are dedicated controllers which exclusively control the plurality of production facilities 10a, 10b, and 10c, respectively.

The plurality of pieces of facility design information 100a, 100b, and 100c indicate design information of the plurality of production facilities 10a, 10b, and 10c, respectively. The action plan design information 102 indicates design information of the action plan generation apparatus 16.

The control coordination apparatus 14 refers to the plurality of pieces of facility design information 100a, 100b, and 100c and the action plan design information 102. Further, on the basis of the plurality of pieces of facility design information 100a, 100b, and 100c and the action plan design information 102 which are referred to, the control coordination apparatus 14 collects a plurality of pieces of facility operation data 110a, 110b, and 110c from the plurality of controllers 18a, 18b, and 18c, respectively, and transmits an operation information file 114 including a facility operation information 112 including the plurality of pieces of facility operation data 110a, 110b, and 110c which are collected, to the action plan generation apparatus 16.

The action plan generation apparatus 16 receives the transmitted operation information file 114. Further, the action plan generation apparatus 16 transmits an action plan file 120 including an action plan 118 including a plurality of pieces of action information 116a, 116b, and 116c to the control coordination apparatus 14. At that time, the action plan generation apparatus 16 generates the action plan file 120 to be transmitted, on the basis of the received operation information file 114. The action plan 118 includes information for specifying a content of control to be performed by the plurality of controllers 18a, 18b, and 18c. In the first preferred embodiment, the action plan 118 includes values of parameters to be used for the control to be performed by the plurality of controllers 18a, 18b, and 18c. Further, in the first preferred embodiment, the action plan generation apparatus 16 transmits the action plan file 120 at a time. Furthermore, in the first preferred embodiment, the plurality of pieces of action information 116a, 116b, and 116c are given to the plurality of production facilities 10a, 10b, and 10c, respectively. The plurality of pieces of action information 116a, 116b, and 116c are the respective pieces of action information on the plurality of production facilities 10a, 10b, and 10c.

The control coordination apparatus 14 refers to the plurality of pieces of facility design information 100a, 100b, and 100c and the action plan design information 102. Further, on the basis of the plurality of pieces of facility design information 100a, 100b, and 100c and the action plan design information 102 which are referred to, the control coordination apparatus 14 receives the action plan file 120, and on the basis of the received action plan file 120, the control coordination apparatus 14 transmits the plurality of pieces control data 122a, 122b, and 122c to the plurality of controllers 18a, 18b, and 18c, respectively. The plurality of pieces of control data 122a, 122b, and 122c include pieces of information for specifying the contents of control to be performed by the plurality of controllers 18a, 18b, and 18c, respectively. In the first preferred embodiment, the plurality of pieces of control data 122a, 122b, and 122c include values of parameters to be used for the control to be performed by the plurality of controllers 18a, 18b, and 18c.

The plurality of controllers 18a, 18b, and 18c receive the plurality of pieces of control data 122a, 122b, and 122c, respectively. Further, the plurality of controllers 18a, 18b, and 18c perform controls having the contents specified by the information included in the plurality of pieces of control data 122a, 122b, and 122c. In the first preferred embodiment, the plurality of controllers 18a, 18b, and 18c perform the controls in accordance with the values of the parameters to be used for control, which are included in the plurality of pieces of control data 122a, 122b, and 122c.

The controls performed by the plurality of controllers 18a, 18b, and 18c are thereby coordinated in accordance with the action plan 118.

The action plan generation apparatus 16 cannot read the plurality of pieces of facility operation data 110a, 110b, and 110c but can read the operation information file 114. The plurality of controllers 18a, 18b, and 18c cannot receive the action plan file 120 but can receive the plurality of pieces of control data 122a, 122b, and 122c, respectively.

It is thereby possible to perform the controls of the plurality of production facilities 10a, 10b, and 10c in accordance with the common action plan 118 without giving the function of performing the controls of the plurality of production facilities 10a, 10b, and 10c in accordance with the common action plan 118 to the plurality of controllers 18a, 18b, and 18c. Further, it is possible to cause the plurality of controllers 18a, 18b, and 18c to perform the controls of the production facilities 10a, 10b, and 10c in coordination.

1.3 Facility Design Information and Action Plan Design Information

As shown in FIG. 2, each piece of facility design information 100 included in the plurality of pieces of facility design information 100a, 100b, and 100c includes communication information 130. The respective pieces of communication information 130 included in the plurality of pieces of facility design information 100a, 100b, and 100c are information to be used to communicate with the plurality of controllers 18a, 18b, and 18c, respectively. The communication information 130 includes communication settings or the like. The communication settings included in the communication information 130 included in the plurality of pieces of facility design information 100a, 1.00b, and 100c include the types, the internet protocol (IP) addresses, and the like of the plurality of controllers 18a, 18b, and 18c, respectively.

As shown in FIG. 2, the action plan design information 102 includes requested facility operation data 132 and a communication method 134. The requested facility operation data 132 are facility operation data requested by the action plan generation apparatus 16. The communication method 134 is a method of communication with action plan generation apparatus 16. The communication method 134 includes format information 136, a storage location 138, and format information 140. The format information 136 is information indicating a file format of the operation information file 114 that the action plan generation apparatus 16 can read. The format information 136 includes, for example, the types, the information on description specifications of the contents, specifications of file names including time stamps, and the like of the plurality of pieces of facility operation data 110a, 110b, and 110c. The storage location 138 is a storage location of the operation information file 114. The format information 140 is information indicating a file format of the action plan file 120.

The control coordination apparatus 14 can refer to the format information 136 which is the information indicating the file format of the operation information file 114 and the format information 140 which is the information indicating the file format of the action plan file 120. The control coordination apparatus 14 and the action plan generation apparatus 16 thereby share the respective file formats of the operation information file 114 and the action plan file 120.

1.4 Elements Provided in Control Coordination Apparatus and Action Plan Generation Apparatus As shown in FIG. 1, the control coordination apparatus 14 includes a facility information collection unit 150, an operation information output unit 152, a file data communication unit 154, a control information generation unit 156, a control information transmission determination unit 158, and a control information transmission unit 160.

The action plan generation apparatus 16 includes an action plan calculation unit 180.

The facility information collection unit 150 collects the plurality of pieces of facility operation data 110a, 110b, and 10c from the plurality of controllers 18a, 18b, and 18c. Further, the facility information collection unit 150 generates the facility operation information 112 including the plurality of pieces of facility operation data 110a, 110b, and 110c which are collected. At that time, the facility information collection unit 150 collects the plurality of pieces of facility operation data 110a, 110b, and 110c in accordance with the communication information 130 included in the plurality of pieces of facility design information 100a, 100b, and 100c, respectively. The plurality of pieces of facility operation data 110a, 110b, and 110c Which are collected coincide with the requested facility operation data 132 included in the action plan design information 102. The plurality of pieces of facility operation data 110a, 110b, and 110c which are collected indicate respective operating states of the plurality of production facilities 10a, 10b, and 10c. Each of the plurality of pieces of facility operation data 110a, 110b, and 110c is individual data. The plurality of pieces of facility operation data 110a, 110b, and 110c are respective data units managed by the plurality of controllers 18a, 18b, and 18c. The plurality of pieces of facility operation data 110a, 110b, and 110c are, for example, respective variables in control programs to be executed by the plurality of controllers 18a, 18b, and 18c. Alternatively, the plurality of pieces of facility operation data 110a, 110b, and 110c are respective vales of the parameters used for the control to be performed by the plurality of controllers 18a, 18b, and 18c. The facility operation data included in the facility operation information 112 may be part of the collected facility operation data.

The operation information output unit 152 converts the generated facility operation information 112 into the operation information file 114 and outputs the operation information file 114. At that time, the operation information output unit 152 converts the facility operation information 112 into the operation information file 114 on the basis of the format information 136 included in the action plan design information 102. The operation information file 114 to be outputted has a file format which is readable by the action plan generation apparatus 16.

The file data communication unit 154 transmits the outputted operation information file 114 to the action plan generation apparatus 16. At that time, the file data communication unit 154 transmits the operation information file 114 to the action plan generation apparatus 16 in accordance with the communication method 134 included in the action plan design information 102.

By performing these series of processings, the action plan generation apparatus 16 takes in the facility operation information 112 through the control coordination apparatus 14.

The action plan calculation unit 180 receives the operation information file 114. Further, the action plan calculation unit 180 generates the plurality of pieces of action information 116a, 116b, and 116c. Furthermore, the action plan calculation unit 180 makes the action plan 118 including the plurality of pieces of action information 116a, 116b, and 116c which are generated. At that time, the action plan calculation unit 180 refers to the received operation information file 114 as necessary and makes the action plan 118 on the basis of the operation information file 114 which is referred to. Further, the action plan calculation unit 180 generates the action plan file 120 including the action plan 118 that the action plan calculation unit 180 makes. The plurality of pieces of action information 116a, 116b, and 116c Which are generated are respective pieces of information for specifying the contents of control of the plurality of production facilities 10a, 10b, and 10c. The action plan 118 to be made is an action plan assembling a series of plurality of pieces of action information 116a, 116b, and 116c needed to control the plurality of production facilities 10a, 10b, and 10c in coordination. The action plan 118 may be an action plan to be used for production activities or may be an action plan to be used for start-up adjustment, maintenance, or the like.

The action plan calculation unit 180 makes the action plan 118 mainly by performing non-real time information processing that is difficult for the plurality of controllers 18a, 18b, and 18c to perform. For example, the action plan calculation unit 180 performs machine simulation of the plurality of production facilities 10a, 10b, and 10c by using simulation models of the plurality of production facilities 10a, 10b, and 10c, compares respective pieces of machine operation information of the plurality of production facilities 10a, 10b, and 10c, which are included in the operation information file 114, with the result of the machine simulation, and learns optimum values of the parameters to be used for controlling the plurality of production facilities 10a, 10b, and 10c. Further, the action plan calculation unit 180 changes the values of the parameters of the machine operations of the plurality of production facilities 10a, 10b, and 10c on the basis of the learning result. Furthermore, the action plan calculation unit 180 generates the action plan file 120 including the type of the parameters having the changed values and the changed values of the parameters.

The action plan calculation unit 180 may generate the action plan file 120 including the product type to be produced and the number of products while the plurality of production facilities 10a, 1.0b, and 10c perform the production activities. The product type to be produced and the number of products are to be given as the manufacturing instruction to the plurality of production facilities 10a, 10b, and 10c. The action plan calculation unit 180 may generate the action plan file 120 including an instruction for executing the control program.

In a case where the plurality of production facilities 10a, 10b, and 10c fail the operation, where changeover for changing the product types to be produced by the plurality of production facilities 10a, 10b, and 10c is performed, or the like, the action plan calculation unit 180 may generate the action plan file 120 including the instruction for executing the control program and the values of the parameters in the control program. The action plan calculation unit 180 may generate the action plan file 120 including the values of the parameters to be used for controls to be performed by the plurality of production facilities 10a, 10b, and 10c, an instruction for executing a trial operation program, or the like.

The file data communication unit 154 receives the generated action plan file 120 from the action plan generation apparatus 16. At that time, the file data communication unit 154 receives the action plan file 120 in accordance with the communication method 134 included in the action plan design information 102.

The control information generation unit 156 generates the plurality of pieces of control data 122a, 122b, and 122c from the received action plan file 120. The plurality of pieces of control data 122a, 122b, and 122c to be generated include respective pieces of information for specifying the contents of control to be performed by the plurality of controllers 18a, 18b, and 18c. Further, the control information generation unit 156 generates destination information 124a and . . . . The destination information 124a and . . . to be generated are respective pieces of information needed for the control information transmission unit 160 to transmit the plurality of pieces of control data 122a, 122b, and 122c to the plurality of controllers 18a, 18b, and 18c. Further, the control information generation unit 156 generates a plurality of pieces of control information 126a, 126b, and 126c including the plurality of pieces of control data 122a, 122b, and 122c which are generated and the destination information 124a and . . . which are generated, respectively. At that time, the control information generation unit 156 generates the plurality of pieces of control data 122a, 122b, and 122c on the basis of the format information 140 included in the action plan design information 102. The control information generation unit 156 converts the plurality of pieces of action information 116a, 116b, and 116c into the plurality of pieces of control information 126a, 126b, and 126c on the basis of the format information 140 included in the action plan design information 102. The plurality of pieces of action information 116a, 116b, and 116c which serve as a base of generation of the plurality of pieces of control information 126a, 126b, and 126c correspond to pieces of information each having a data format that the action plan calculation unit 180 can deal with, into which the plurality of pieces of control information 126a, 126b, and 126c are converted, respectively.

The control information transmission determination unit 158 determines whether or not the plurality of pieces of control data 122a, 122b, and 122c can be transmitted to the plurality of controllers 18a, 18b, and 18c, respectively. When the control information transmission determinations unit 158 determines that the plurality of pieces of control data 122a, 122b, and 122c can be transmitted, the control information transmission determination unit 158 causes the control information transmission unit 160 to transmit the plurality of pieces of control data 122a, 122b, and 122c thereto, respectively. Further, when the control information transmission determination unit 158 determines that the plurality of pieces of control data 122a, 122b, and 122c can not be transmitted, the control information transmission determination unit 158 holds the control information transmission unit 160 from transmitting the plurality of pieces of control data. 122a, 122b, and 122c thereto, respectively. Furthermore, when the control information transmission determination unit 158 holds the control information transmission unit 160 from transmitting the plurality of pieces of control data 122a, 122b, and 122c, after determining that the plurality of pieces of control data 122a, 122b, and 122c can be transmitted, the control information transmission determination unit 158 causes the control information transmission unit 160 to transmit the plurality of pieces of control data 122a, 122b, and 122c.

The control information transmission determination unit 158 determines whether or not the plurality of controllers 18a, 18b, and 18c can receive the plurality of pieces of control data 122a, 122b, and 122c, respectively. When the control information transmission determination unit 158 determines that the plurality of controllers 18a, 18b, and 18c can receive the plurality of pieces of control data 122a, 122b, and 122c, the control information transmission determination unit 158 determines that the plurality of pieces of control data 122a, 122b, and 122c can be transmitted. Further, when the control information transmission determination unit 158 does not determine that the plurality of controllers 18a, 18b, and 18c can receive the plurality pieces of control data 122a, 122b, and 122c, the control information transmission determination unit 158 does not determine that the plurality of pieces of control data 122a, 122b, and 122c can be transmitted.

Considered will be a case where it is necessary to restart the plurality of controllers 18a, 18b, and 18c in order to change the values of the parameters after the plurality of pieces of control data 122a, 122b, and 122c including the instruction for changing the values of the parameters in the control program are transmitted to the plurality of controllers 18a, 18b, and 18c. In this case, before the plurality of controllers 18a, 18b, and 18c are restarted, the control information transmission determination unit 158 does not determine that the plurality of pieces of control data 122a, 122b, and 122c can be transmitted, respectively, and after the plurality of controllers 18a, 18b, and 18c are restarted, the control information transmission determination unit 58 determines that the plurality of pieces of control data 122a, 122b, and 122c can be transmitted, respectively.

The control information transmission unit 60 transmits the plurality of pieces of control data 122a, 122b, and 122c to the plurality of controllers 18a, 18b, and 18c, respectively. When it is determined that the plurality of pieces of control data 122a, 122b, and 122c can be transmitted, the control information transmission unit 160 transmits the plurality of pieces of control data 122a, 122b, and 122c to the plurality of controllers 18a, 18b, and 18c, respectively. At that time, the control information transmission unit 160 transmits respective pieces of control data included in the plurality of pieces of control data 122a, 122b, and 122c to the plurality of controllers 18a, 18b, and 18c, respectively, on the basis of the pieces of facility design information 100a, 100b, and 100c including respective pieces of information on communication with the plurality of production facilities 10a, 10b, and 10c. At that time, the control information transmission unit 160 solves a transmission method from the destination information 124a and . . . and the plurality of pieces of facility design information 100a, 100b, and 100c included in the plurality of pieces of control information 126a, 126b, and 126c and transmits the plurality of pieces of control data 122a, 122b, and 122c to the plurality of controllers 18a, 18b, and 18c, respectively, in accordance with the solved transmission method.

By performing these series of processings, the control coordination apparatus 14 can transmit the plurality of pieces of control data 122a, 122b, and 122c to the plurality of controllers 18a, 18b, and 18c, respectively, on the basis of the plurality of pieces of action information 116a, 116b, and 116c which are generated by the action plan generation apparatus 16. Further, the control coordination apparatus 14 can transmit the plurality of pieces of control data 122a, 122b, and 122c to the plurality of controllers 18a, 18b, and 18c, respectively, on the basis of the action plan 118 made by the action plan generation apparatus 16.

1.5 Hardware

Figure 3:
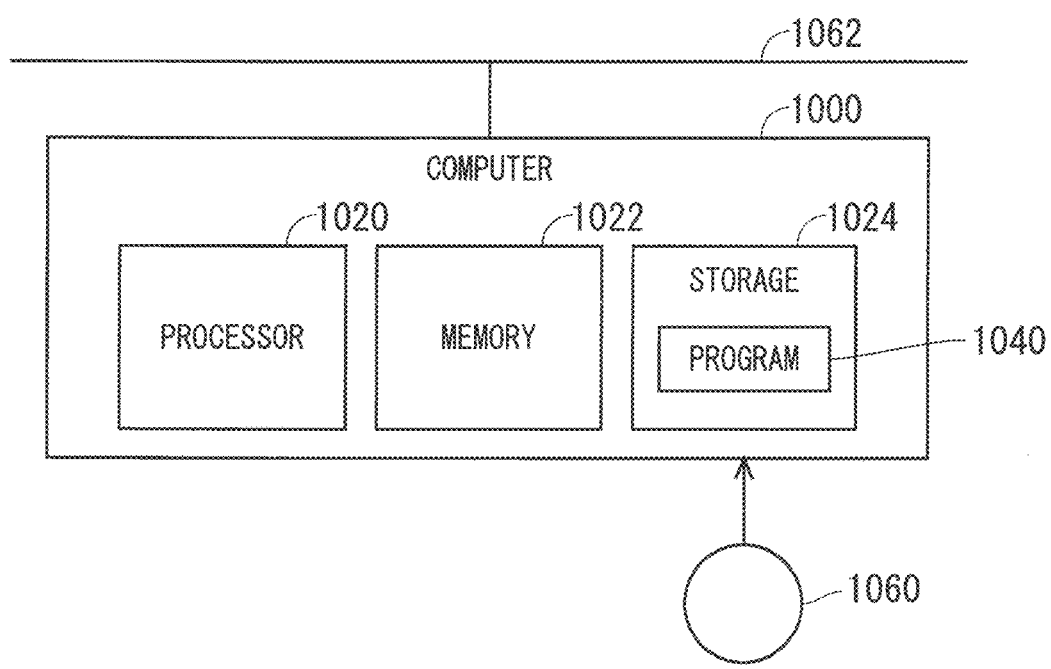
FIG. 3 is a block diagram schematically showing a computer which can form each of a control coordination apparatus and an action plan generation apparatus which are included in the production system in accordance with the first preferred embodiment.

FIG. 3 is a block diagram schematically showing a computer which can form each of the control coordination apparatus and the action plan generation apparatus which are included in the production system in accordance with the first preferred embodiment.

Each of the control coordination apparatus 14 and the action plan generation apparatus 16 can be formed of a computer 1000 shown in FIG. 3.

As shown in FIG. 3, the computer 1000 includes a processor 1020, a memory 1022, and a storage 1024.

A program 1040 is installed in the storage 1024. The installation of the program 1040 may be performed by writing the program 1040 read out from an external recording medium 1060 into the storage 1024, or may be performed by writing the program 1040 received through a network 1062 into the storage 1024.

The processor 1020 is any one of a central processing unit (CPU), a graphics processing unit (GPU), a digital signal processor (DSP), and the like. The memory 1022 is a random access memory (RAM) or the like. The storage 1024 is any one of a hard disk drive (HDD), a solid state drive (SSD), a RAM disk, and the like. The external recording medium 1060 is any one of a compact disc (CD), a digital versatile disc (DVD), a Blu-ray disc (BD), a universal serial bus (USB) memory, and the like.

In a case where the control coordination apparatus 14 and the action plan generation apparatus 16 are formed of the computer 1000, the program 1040 is a program for causing the computer 1000 to operate as the control coordination apparatus 14 and the action plan generation apparatus 16, respectively. The whole of or the part of the control coordination apparatus 14 and the action plan generation apparatus 16 may be formed of hardware not executing any program.

In the computer 1000, the program 1040 installed in the storage 1024 is loaded into the memory 1022 and the loaded program 1040 is executed by the processor 1020. The computer 1000 thereby operates as the control coordination apparatus 14 and the action plan generation apparatus 16.

The memory 1022, the storage 1024, and the external recording medium 1060 are non-transitory computer-readable recording media in which the program 1040 is recorded.

1.6 Effects of the First Preferred Embodiment

Hereinafter, for helping to understand effects of the first preferred embodiment, problems in development of the software for the production system will be described and after that, the effects of the first preferred embodiment will be described.

First, communication between the control coordination apparatus and the production facility will be described.

The control of the production facility requires real-time property. For this reason, the controller for controlling the production facility is a dedicated controller in general. The data to be communicated with the dedicated controller are generally different depending on the use of the dedicated controller.

Considered will be a case, for example, where the dedicated controller is a programmable logic controller (PLC). In many cases, the PLC controls many input-output devices to preside over the control of a production device. In many cases, the PLC has a plurality of functions of communicating data with external devices such as other controllers, a personal computer (PC), a server, and the like. In many cases, the data to be communicated is a value of variable in the control program described by a user. For this reason, in a case where the dedicated controller is the PLC, the data to be communicated with the dedicated controller include a value of variable in the control program described by the user in many cases.

Further, considered will be a case where the dedicated controller is a servo system controller. The servo system controller controls a servo motor. In many cases, the servo system controller communicates a value of a parameter of the servo motor which is set in advance in the servo system controller and a value indicating a control state of the servo motor. For this reason, in the case where the dedicated controller is the servo system controller, the data to be communicated with the dedicated controller include the value of the parameter of the servo motor which is set in advance in the servo system controller and the value indicating the control state of the servo motor in many cases.

Furthermore, considered will be a case where the dedicated controller is a robot controller. The robot controller controls a robot. Further, in order to cause the robot to perform one operation, a plurality of operation commands must be issued to the robot in many cases. Then, in many cases, the robot controller performs the control program to issue the plurality of operation commands to the robot. For this reason, in the case where the dedicated controller is the robot controller, the data to be communicated with the dedicated controller include an instruction for starting up the control program in many cases.

Moreover, the data to be communicated with the dedicated controller is different depending on the maker which manufactures the dedicated controller. This is because even in a case where the dedicated controllers have the same use, when the makers which manufacture the dedicated controllers are different, parameters used by the dedicated controllers and specifications of the operations of the dedicated controllers are different.

Still moreover, in a case where the control program to be executed by the dedicated controller is a user program which is generated by the user, the data to be communicated with the dedicated controller are different depending on the specification of the data defined by the user in the user program.

From these circumstances, it is difficult for engineers other than the production facility designer who perform the design and adjustment of the control program to be executed for controlling the production facility, to grasp the data to be communicated with the dedicated controller in order to perform a desired control of the production facility. In a case, for example, where the control program to be executed by the servo system controller in order to change the value of the parameter of a specific servo motor includes a user program, it is difficult for engineers other than the production facility designer who understands the user program to grasp the control data which must be transmitted to the dedicated controller in order to change the value of the parameter of the specific servo motor.

Further, in many cases, the production facility designer performs generation and adjustment of the control program of the production facility by using dedicated configuration software provided for each use of the dedicated controller. Furthermore, in many cases, the production facility designer is an engineer in the technical field of machinery or electricity. For this reason, in many cases, the production facility designer does not sufficiently have the ability of software development such as creating of an original software tool, or the like, by using a communication driver used for communicating with the dedicated controller, which is provided by a maker that manufactures the dedicated controller. Therefore, when the software for communicating the data with the dedicated controller is provided, the production facility designer can easily set the parameter by using the software in accordance with the design of the production facility. It is difficult, however, for the production facility designer to develop an original software for each production system.

Subsequently, described will be a program to be executed in the action plan generation apparatus which makes an action plan.

The techniques on the action plan generation apparatus for making an action plan have advanced markedly, and methods for achieving the software for making an action plan are diversified.

A software library for operating software of recent years which is used to make an action plan is widely used by research institutes such as universities or the like. For this reason, the operating system (OS) that the software library is adaptable to is open source base Linux (registered trademark) in many cases. On the other hand, the OS that the dedicated configuration software provided for each use of the dedicated controller and the communication driver used for communicating with the dedicated controller, which is provided by the maker which manufactures the dedicated controller, is adaptable to is Windows (registered trademark) manufactured by Microsoft (registered trademark) Corporation in many cases. Therefore, in many cases, the OS that the software library is adaptable to is different from the OS that the configuration software and the communication driver are adaptable to.

Further, the software library for operating the software of recent years which is used to make an action plan is described by a programming language suitable for description of matrix operation in many cases. The programming language is MATLAB (registered trademark), Simulink (registered trademark), Python (registered trademark), or the like. On the other hand, the dedicated configuration software provided for each use of the dedicated controller and the communication driver used for communicating with the dedicated controller, which is provided by the maker which manufactures the dedicated controller are described by C language in many cases. Therefore, in many cases, the programming language describing the software library is different from the programming language describing the configuration software and the communication driver.

For this reason, in order to achieve the function of making an action plan and the function of communicating with the dedicated controller for controlling the production facility by one software, needed are an operation of redescribing the software library described by the programming language suitable for description of matrix operation, by C language, and another operation of causing the software library adaptable to Linux to be adaptable to Windows. For this reason, the integration cost needed to achieve the function of making an action plan and the function of communicating with the dedicated controller for controlling the production facility by one software becomes high.

According to the first preferred embodiment, the action plan calculation unit 180 can be operated on the software library which is widely used by the research institutes, and it is thereby possible to achieve the production system 1 which cars communicate with the plurality of production facilities. 10*a*, 10*b*, and 10*c* by using simple parameters.

Further, according to the first preferred embodiment, it is possible to construct the control coordination apparatus 14 in the development environment of the software that the communication driver used for communicating with the plurality of controllers 18*a*, 18*b*, and 18*c* is adaptable to, and the control coordination apparatus 14 can also communicate with the plurality of controllers 18*a*, 18*b*, and 18*c* by using simple parameters. It thereby becomes easier to communicably connect the control coordination apparatus 14 to the plurality of production facilities 10*a*, 10*b*, and 10*c*.

Furthermore, according to the first preferred embodiment, it is possible to construct the action plan generation apparatus 16 in the software environment that the software for making an action plan is adaptable to. Further, the action plan generation apparatus 16 can communicate the information, i.e., a file which can be shared also in a different OS, software platform, or the like with the control coordination apparatus 14.

From these reasons, the action plan generation apparatus 16 which is constructed in various platforms can communicate with the plurality of production facilities 10*a*, 10*b*, and 10*c* by using simple parameters.

According to the first preferred embodiment, the facility information collection unit 150 and the control information transmission unit 160 communicates with the plurality of controllers 18*a*, 18*b*, and 18*c* on the basis of the plurality of pieces of facility design information 100*a*, 100*b*, and 100*c* and the action plan design information 102. Further, the operation information output unit 152 and the control information generation unit 156 communicate the operation information file 114 and the action plan file 120 which have the file formats that can be handled by the action plan calculation unit 180, with the action plan calculation unit 180. It is thereby possible to control the plurality of production facilities 10*a*, 10*b*, and 10*c* in accordance with the common action plan 118 without giving the function of controlling the plurality of production facilities 10*a*, 10*b*, and 10*c* in accordance with the common action plan 118 to the plurality of controllers 18*a*, 18*b*, and 18*c*. Further, it is possible to cause the plurality of controllers 18*a*, 18*b*, and 18*c* to control the plurality of production facilities 10*a*, 10*b*, and 10*c* in coordination.

1.7 Variations

In the first preferred embodiment, the control coordination apparatus 14 is formed of a computer different from a computer forming the action plan generation apparatus 16. The control coordination apparatus 14 may be formed, however, of the same computer as that forming the action plan generation apparatus 16. In this case, the computer may be caused to operate as the control coordination apparatus 14 and the action plan generation apparatus 16 by executing one program by the processor included in the computer.

In the first preferred embodiment, the action plan 118 includes the values of the parameters to be used for the controls performed by the plurality of controllers 18*a*, 18*b*, and 18*c*. The action plan 118 may include, however, information other than these values. The action plan 118 may include, for example, values of variables in the control programs to be executed by the plurality of controllers 18*a*, 18*b*, and 18*c*, commands for causing the plurality of controllers 18*a*, 18*b*, and 18*c* to start execution of specific processings, instructions for causing the plurality of controllers 18*a*, 18*b*, and 18*c* to execute the user program for changing the state of the plurality of controllers 18*a*, 18*b*, and 18*c* to a specific state, or the like.

In the first preferred embodiment, the action plan file 120 has a format shown in FIG. 1. The action plan file 120 may have, however, a format other than the above format.

In the first preferred embodiment, the action plan file 120 includes the plurality of pieces of action information 116a, 116b, and 116c to be given to the plurality of controllers 18a, 18b, and 18c, respectively. The action plan file 120 may include, however, action information other than the plurality of pieces of action information 116a, 116b, and 116c. For example, the action plan file 120 may include a plurality of pieces of action information which are given to one controller in series.

In the first preferred embodiment, the action plan generation apparatus 16 transmits the action plan file 120 at a time. The action plan generation apparatus 16 may transmit, however, the action plan file 120 separately in two or more times.

The action plan generation apparatus 16 may transmit the action plan file 120 in conjunction with the reception of the operation information file 114 including specific facility operation information.

The action plan generation apparatus 16 may change the control coordination apparatus and the production facility to be connected, in accordance with the file name and the storage location of the action plan file 120.

The action plan generation apparatus 16 may include information needed to manage the sequence of reading the action plan file 120 in the action plan file 120.

2 The Second Preferred Embodiment

Figure 4:
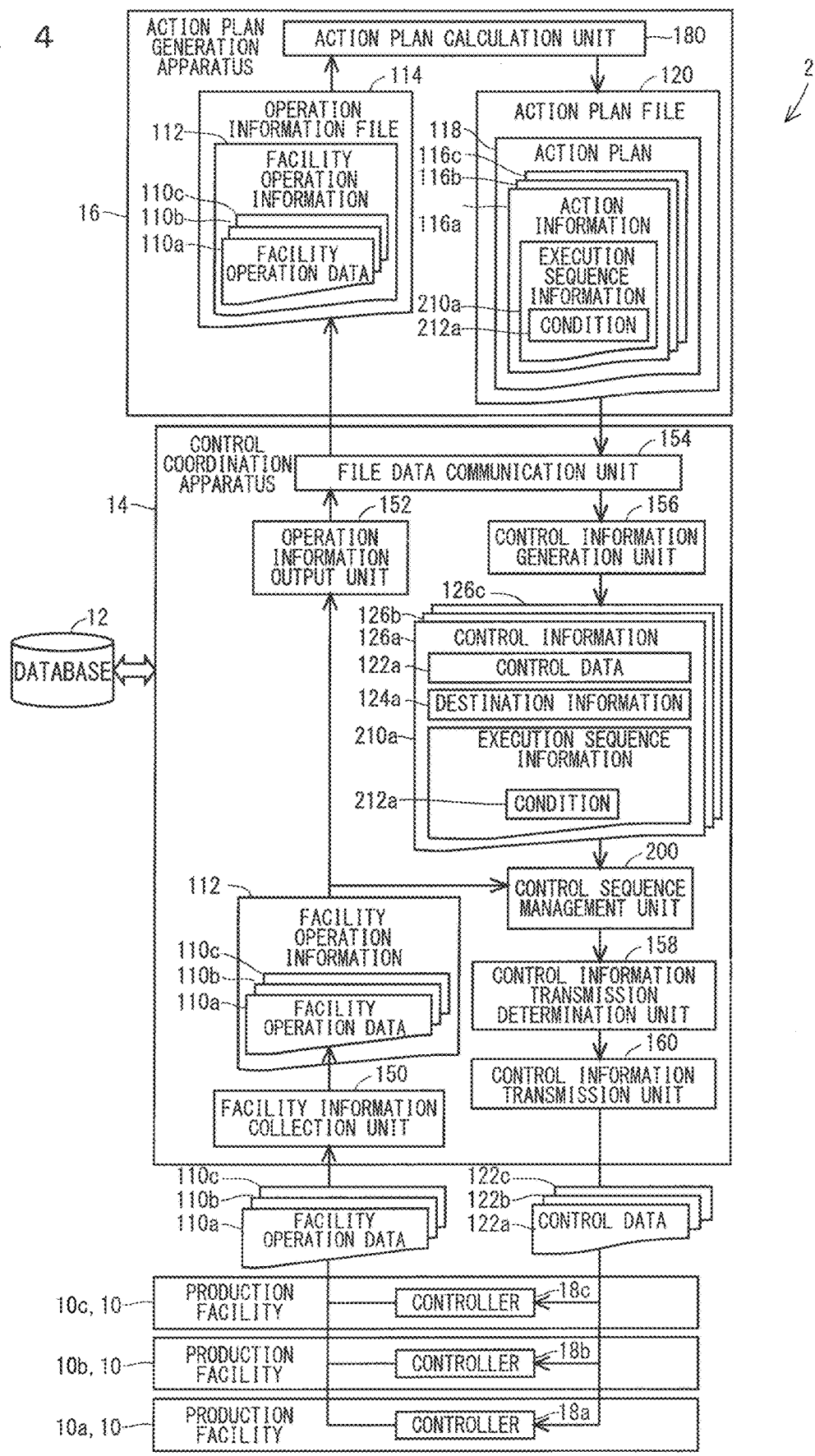
FIG. 4 is a block diagram schematically showing a production system in accordance with a second preferred embodiment.

FIG. 4 is a block diagram schematically showing a production system in accordance with the second preferred embodiment.

A production system 2 of the second preferred embodiment shown in FIG. 4 is different from the production system 1 of the first preferred embodiment shown in FIG. 1 mainly in the points described below. As to points other than those described below, the same constituent elements as those adopted in the production system 1 are also adopted in the production system 2.

As shown in FIG. 4, the control coordination apparatus 14 further includes a control sequence management unit 200.

The action plan calculation unit 180 generates a plurality of pieces of execution sequence information 210a and . . . . Further, the action plan calculation unit 180 generates the plurality of pieces of action information 116a, 116b, and 116c including the plurality of pieces of execution sequence information 210a and . . . , respectively. The plurality of pieces of execution sequence information 210a and . . . are respective pieces of information needed to manage the sequence of transmitting the plurality of pieces of control data 122a, 122b, and 122c. The plurality of pieces of execution sequence information 210a and . . . include conditions 212a and . . . , respectively. The conditions 212a and . . . are, for example, conditions indicating that the values indicated by specific signals outputted from the plurality of controllers 18a, 18b, and 18c are specific values, respectively. The respective values indicated by the specific signals outputted from the plurality of controllers 18a, 18b, and 18c are, for example, values of the parameters managed by the plurality of controllers 18a, 18b, and 18c. Further, the respective values indicated by the specific signals outputted from the plurality of controllers 18a, 18b, and 18c are, for example, values of the variables in the control programs to be executed by the plurality of controllers 18a, 18b, and 18c.

The control information generation unit 156 generates the plurality of pieces of control information 126a, 126b, and 126c including the plurality of pieces of execution sequence information 210a and which are generated, respectively.

The control sequence management unit 200 manages the sequence of transmitting the plurality of pieces of control data 122a, 122b, and 122c on the basis of the plurality of pieces of execution sequence information 210a and . . . . At that time, the control sequence management unit 200 checks the plurality of pieces of execution sequence information 210a and . . . included in the plurality of pieces of control information 126a, 126b, and 126c, respectively, and manages the sequence of transmitting the plurality of pieces of control data 122a, 122b, and 122c on the basis of the plurality of pieces of execution sequence information 210a and . . . which are checked. At that time, the control sequence management unit 200 determines whether or not the conditions 212a and . . . are satisfied. When the control sequence management unit 200 determines that the conditions 212a and are satisfied, the control sequence management unit 200 causes the control information transmission unit 160 to transmit the plurality of piece of control data 122a, 122b, and 122c, respectively. Further, when the control sequence management unit 200 determines that the conditions 212a and are not satisfied, the control sequence management unit 200 holds the control in formation transmission unit 160 from transmitting the plurality of piece of control data 122a, 122b, and 122c, respectively. Furthermore, when the control sequence management unit 200 holds the control information transmission unit 160 from transmitting the plurality of pieces of control data 122a, 122b, and 122c, after the control sequence management unit 200 determines that the conditions 212a and . . . are satisfied, the control sequence management unit 200 causes the control information transmission unit 160 to transmit the plurality of piece of control data 122a, 122b, and 122c, respectively.

The method of managing the sequence of transmitting the plurality of pieces of control data 122a, 122b, and 122c may be a combination of the method of managing the sequence on the basis of the plurality of pieces of execution sequence information 210a and . . . and any one of methods other than the method. The latter method is, for example, a method of managing the sequence of transmitting the plurality of pieces of control data 122a, 122b, and 122c in accordance with the order of the plurality of pieces of action information 116a, 116b, and 116c in the action plan file 120, regardless of the production facility. In this case, when the condition included in the action information is not satisfied, the control data into which action information after this action information is converted is held from being transmitted. Further, the latter method is, for example, a method of managing the sequence of transmitting the plurality of pieces of control data 122a, 122b, and 122c in accordance with the order of the plurality of pieces of action information 116a, 116b, and 116c in the action plan file 120 for each production facility. The action plan file 120 may include the execution sequence number indicating the sequence of transmitting the plurality of pieces of control data 122a, 122b, and 122c. The execution sequence number may be the common execution sequence number for the plurality of action plan files 120 or may be the execution sequence number specific to one action plan file 120. The management method on the basis of the plurality of pieces of execution sequence information 210a and is taken on only by the control sequence management unit 200. Methods other than the method, however, are not necessarily taken on only by the control sequence management unit 200.

The second preferred embodiment has the same effects as those of the first preferred embodiment.

Moreover, according to the second preferred embodiment, the plurality of pieces of execution sequence information 210*a* and . . . included in the plurality of pieces of control information 126*a*, 126*b*, and 126*c*, respectively, are checked, and on the basis of the plurality of pieces of execution sequence information 210*a* and which are checked, it is possible to manage the sequence of transmitting the plurality of pieces of control data 122*a*, 122*b*, and 122*c*. It is thereby possible to set the timings when the plurality of pieces of control data 122*a*, 122*b*, and 122*c* are transmitted to the plurality of controllers 18*a*, 18*b*, and 18*c* to timings specified by the plurality of pieces of execution sequence information 210*a* and . . . included in the plurality of pieces of control information 126*a*, 126*b*, and 126*c*, respectively.

The Third Preferred Embodiment

Figure 5:
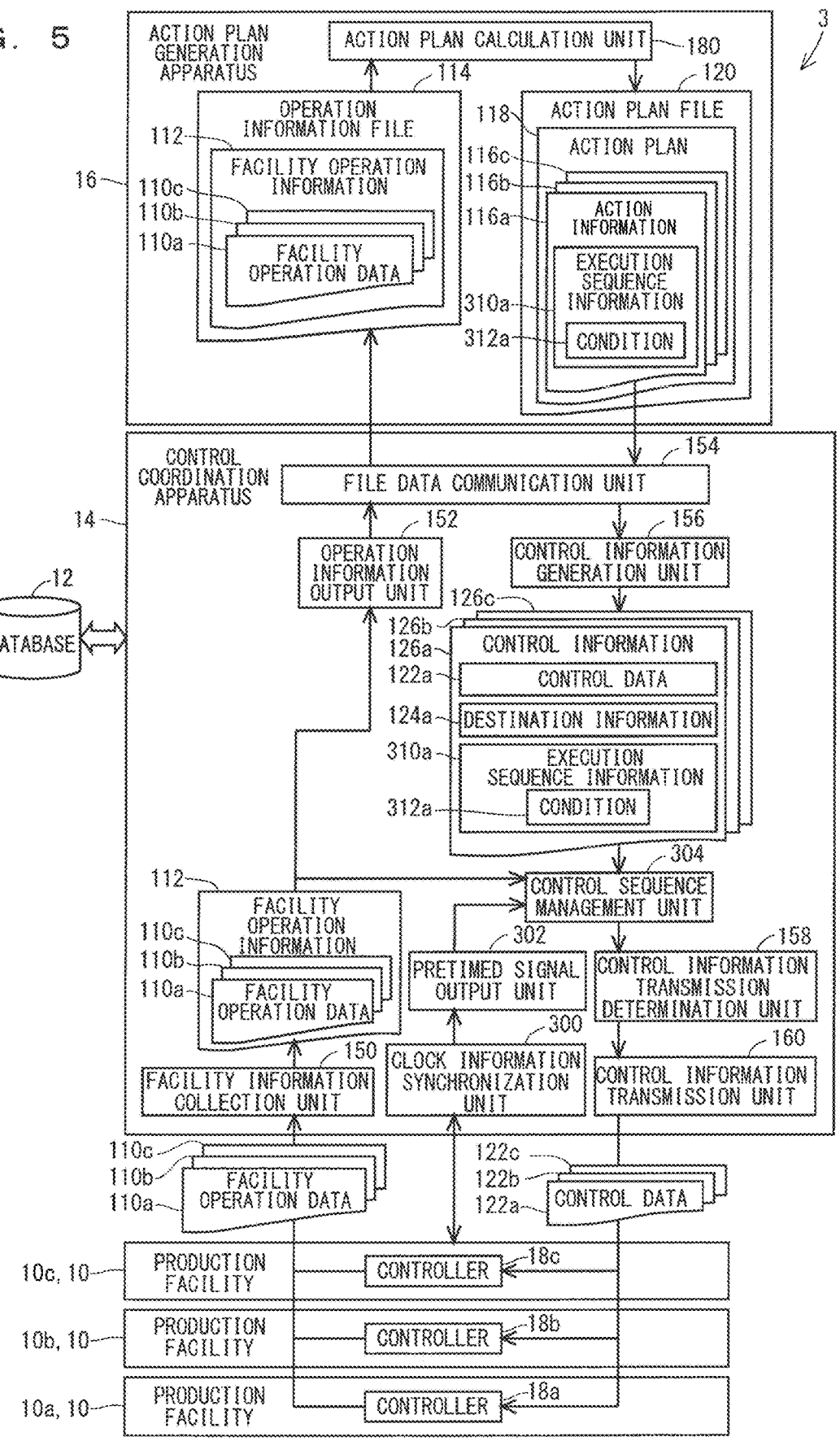
FIG. 5 is a block diagram schematically showing a production system in accordance with a third preferred embodiment.

FIG. 5 is a block diagram schematically showing a production system in accordance with the third preferred embodiment.

A production system 3 of the third preferred embodiment shown in FIG. 5 is different from the production system 1 of the first preferred embodiment shown in FIG. 1 mainly in the points described below. As to points other than those described below, the same constituent elements as those adopted in the production system 1 are also adopted in the production system 3.

As shown in FIG. 5, the control coordination apparatus 14 further includes a clock information synchronization unit 300, a pretimed signal output unit 302, and a control sequence management unit 304.

The action plan calculation unit 180 generates a plurality of pieces of execution sequence information 310*a* and . . . . Further, the action plan calculation unit 180 generates the plurality of pieces of action information 116*a*, 116*b*, and 116*c* including the plurality of pieces of execution sequence information 310*a* and . . . which are generated, respectively. The plurality of pieces of execution sequence information 310*a* and are respective pieces of information needed to manage the sequence of transmitting the plurality of pieces of control data 122*a*, 122*b*, and 122*c*. The plurality of pieces of execution sequence information 310*a* and . . . include a plurality of conditions 312*a* and . . . , respectively. In the third preferred embodiment, the plurality of conditions 312*a* and . . . are conditions indicating that the signal of every cycle forming a pretimed signal is outputted a preset-number of tunes. The preset-number of times are, for example, three times. The plurality of conditions 312*a* and . . . may be conditions indicating that the signal of every cycle forming the pretimed signal is outputted a preset-number of time after determination on the plurality of pieces of execution sequence information 310*a* and . . . is started.

The clock information synchronization unit 300 synchronizes clock information that the control coordination apparatus 14 has with clock information that the plurality of production facilities 10*a*, 10*b*, and 10*c* have. The clock information synchronization unit 300 can be achieved by the well-known technique.

The pretimed signal output unit 302 outputs the pretimed signal having a fixed cycle in accordance with the clock information that the control coordination apparatus 14 has. At that time, the pretimed signal output unit 302 outputs the signal of every cycle forming the pretimed signal every time when the fixed cycle reaches on the basis of synchronization information outputted by the clock information synchronization unit 300. The outputted signal of every cycle is inputted to the control sequence management unit 304. The fixed cycle is set in advance by a parameter of the control coordination apparatus 14. The fixed cycle is, for example, 100 microseconds.

The control sequence management unit 304 manages the sequence of transmitting the plurality of pieces of control data 122*a*, 122*b*, and 122*c* on the basis of the pretimed signal. At that time, the control sequence management unit 304 determines whether or not the plurality of conditions 312*a* and . . . are satisfied. When the control sequence management unit 304 determines that the conditions 312*a* and . . . are satisfied, the control sequence management unit 304 causes the control information transmission unit 160 to transmit the plurality of piece of control data 122*a*, 122*b*, and 122*c*. Further, when the control sequence management unit 304 determines that the plurality of conditions 312*a* and . . . are not satisfied, the control sequence management unit 200 holds the control information transmission unit 160 from transmitting the plurality of piece of control data 122*a*, 122*b*, and 122*c*. When the pretimed signal output unit 302 outputs the signal of every cycle forming the pretimed signal a preset-number of times, the control sequence management unit 304 determines that the plurality of condition 312*a* and . . . are satisfied. The control sequence management unit 304 thereby causes the control information transmission unit 160 to transmit the plurality of pieces of control data 122*a*, 122*b*, and 122*c* in a fixed cycle by using the pretimed signal as an interrupt signal.

The third preferred embodiment is suitably adopted when the plurality of controllers 18*a*, 18*b*, and 18*c* include a controller for performing the control of the servo motor, in which many arithmetic processings are needed to calculate a control value. Then, hereinafter, considered will be a case where the plurality of controllers 18*a*, 18*b*, and 18*c* include a controller for performing a three-axis cooperative control of the servo motor.

Figure 6:
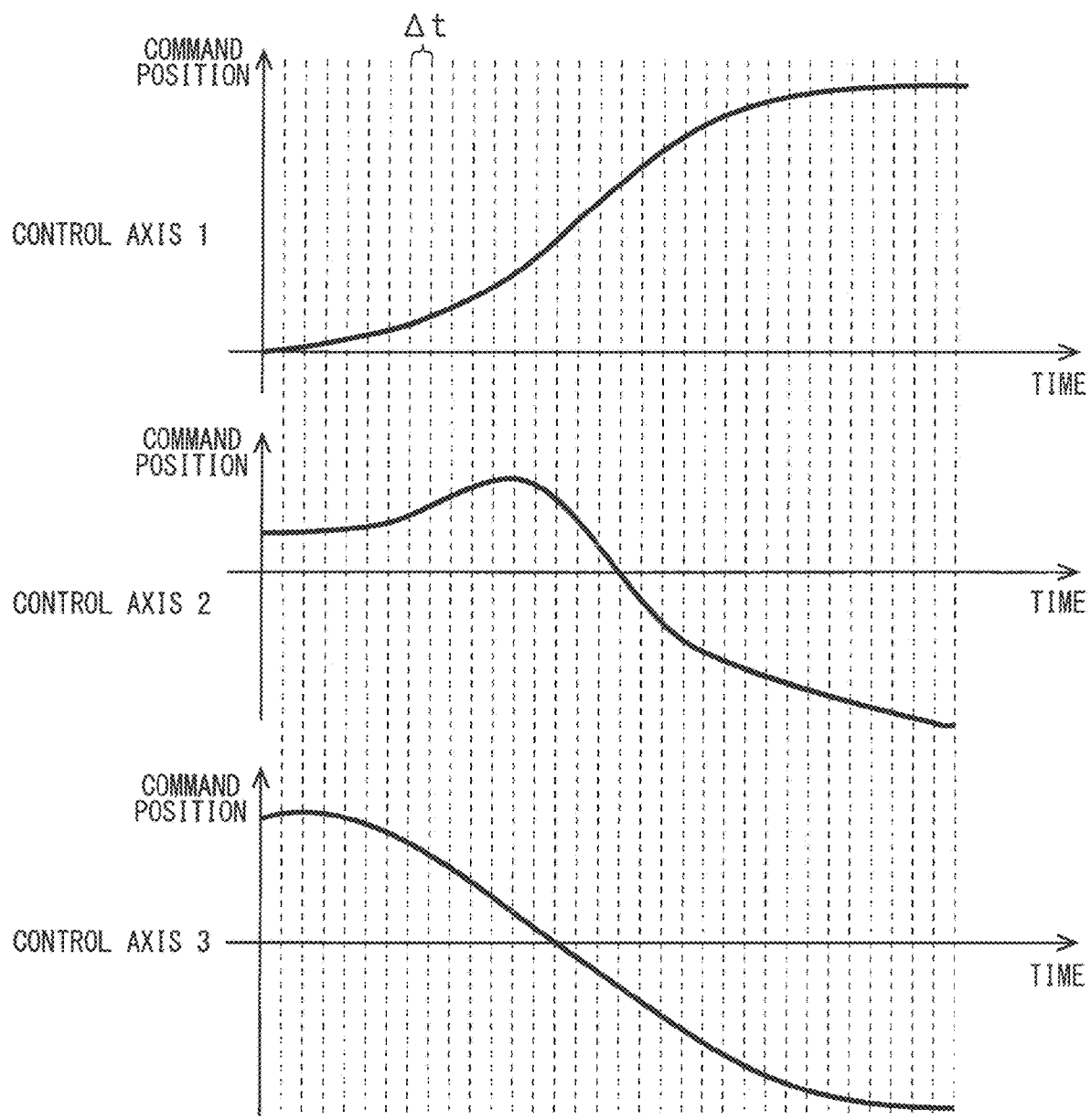
FIG. 6 is a graph showing exemplary control values calculated in a case where a three-axis cooperative control of a servo motor is performed by controllers included in the production system in accordance with the third preferred embodiment.

FIG. 6 is a graph showing exemplary control values calculated in a case where the three-axis cooperative control of the servo motor is performed by the controllers included in the production system in accordance with the third preferred embodiment.

In a case where the control data is transmitted to the controller which performs the three-axis cooperative control of the servo motor, before the control data is transmitted to the controller, the action plan calculation unit 180 calculates the locus of the three-axis cooperative control of the servo motor. Further, as shown in FIG. 6, the action plan calculation unit 180 calculates a control value formed of command positions of a control axis 1, a control axis 2, and a control axis 3 in every period having a fixed length $\Delta t$ obtained by equally dividing the time. Furthermore, the action plan calculation unit 180 generates the action plan file 120 including the calculated control value. Further, the control information transmission unit 160 transmits the calculated control value to the controller in a fixed cycle. It is thereby possible to cause the controller to perform the three-axis cooperative control of the servo motor without causing the controller to perform many arithmetic processings while the controller is caused to perform the three-axis cooperative control of the servo motor.

In a case where the control value calculated in every period having the fixed length $\Delta t$ is included in the action plan file 120, one control value may be included in each action information included in the plurality of pieces of action information 116*a*, 116*b*, and 116*c*, or a plurality of control values may be included in each action information. When the plurality of control values are included in each action information, there may be a case where the control data including one control value selected out of the plurality of control values are transmitted every when the condition is satisfied and the plurality of pieces of control data including the plurality of control values, respectively, are transmitted, and after that, transmission of the control data is completed.

The third preferred embodiment has the same effects as those of the first preferred embodiment.

Moreover, according to the third preferred embodiment, it is possible to provide a production system including a production facility requiring the transmission of the control data to the production facility in a fixed cycle.

The Fourth Preferred Embodiment

Figure 7:
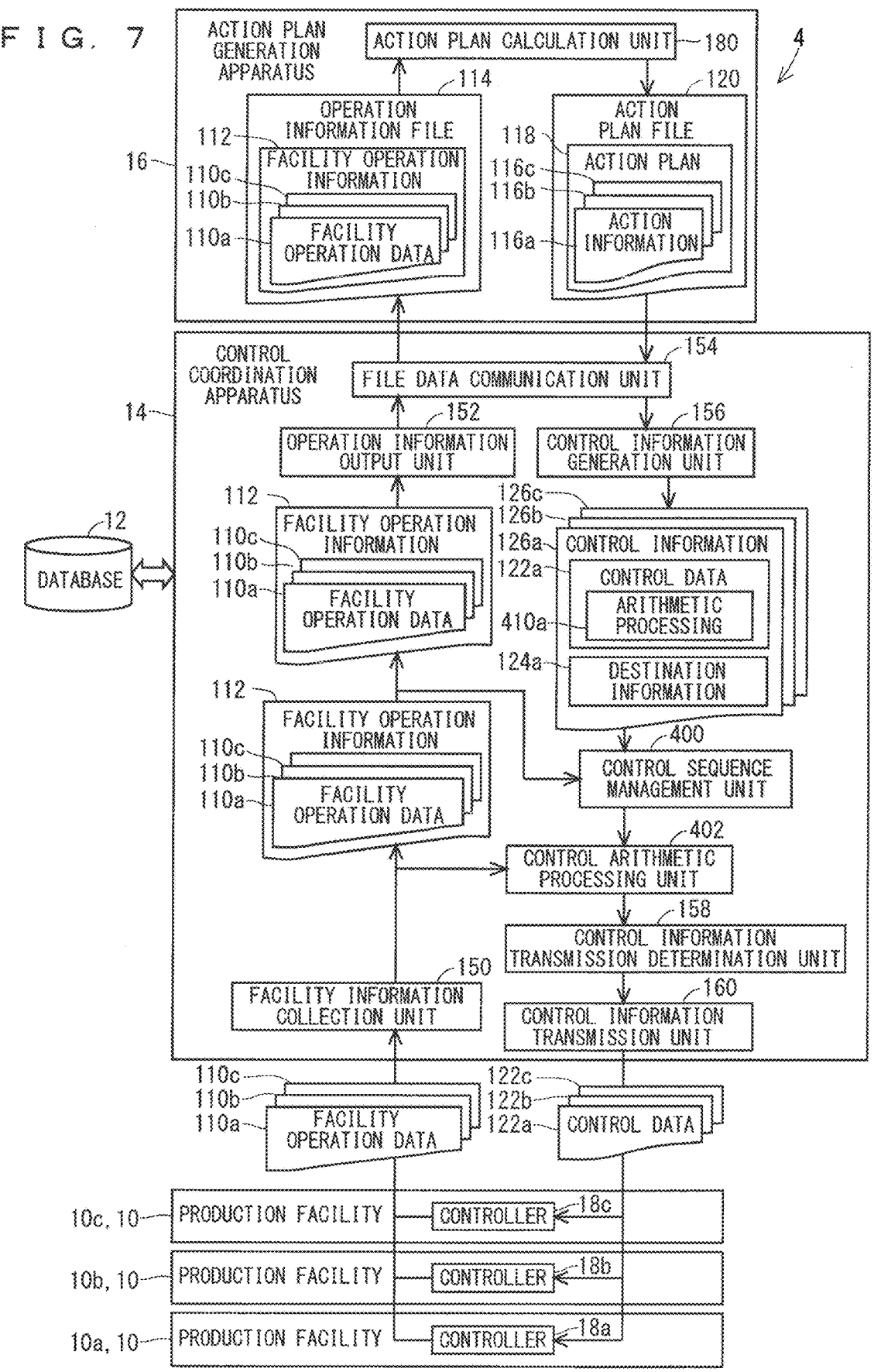
FIG. 7 is a block diagram schematically showing a production system in accordance with a fourth preferred embodiment.

FIG. 7 is a block diagram schematically showing a production system in accordance with the fourth preferred embodiment.

A production system 4 of the fourth preferred embodiment shown in FIG. 7 is different from the production system 1 of the first preferred embodiment shown in FIG. 1 mainly in the points described below. As to points other than those described below, the same constituent elements as those adopted in the production system 1 are also adopted in the production system 4.

As shown in FIG. 7, the control coordination apparatus 14 further includes a control sequence management unit 400 and a control arithmetic processing unit 402.

The control sequence management unit 400 performs the same processing as that performed by the control sequence management unit 200 included in the production system 2.

The control information generation unit 156 generates the plurality of pieces of control data 122a, 122b, and 122c including a plurality of arithmetic processings 410a and . . ., respectively. The plurality of arithmetic processings 410a and . . . are, for example, specified by arithmetic expressions.

The control arithmetic processing unit 402 performs arithmetic operations in accordance with the plurality of arithmetic processings 410a and . . . . Further, the control arithmetic processing unit 402 causes the results of the arithmetic operations performed in accordance with the plurality of arithmetic processings 410a and to be included in the plurality of pieces of control data 122a, 122b, and 122c which are generated, respectively. At that time, the control arithmetic processing unit 402 refers to the plurality of pieces of facility operation data 110a, 110b, and 110c, as necessary and performs the arithmetic operations in accordance with the plurality of arithmetic processings 410a and . . ., respectively, on the basis of the plurality of pieces of facility operation data 110a, 110b, and 110c which are referred to. Furthermore, at that time, the control arithmetic processing unit 402 overwrites the plurality of pieces of control data 122a, 122b, and 122c which are generated with the results of the arithmetic operations performed in accordance with the plurality of arithmetic processings 410a and . . ., respectively.

The fourth preferred embodiment has the same effects as those of the first preferred embodiment.

Moreover, according to the fourth preferred embodiment, the control arithmetic processing unit 402 included in the control coordination apparatus 14 performs the arithmetic operations in accordance with the plurality of arithmetic processings 410a and . . . . For this reason, it is possible to reduce the arithmetic operations performed by the action plan calculation unit 180 and further reduce the processings which must be performed through the action plan calculation unit 180. This effect remarkably appears in the case where the arithmetic operations performed by the action plan calculation unit 180 increase since simple arithmetic operations such as four arithmetic operations or the like are performed on the values included in the plurality of pieces of facility operation data 110a, 110b, and 110c when the plurality of pieces of control data 122a, 122b, and 172c are generated.

5 The Fifth Preferred Embodiment

Figure 8:
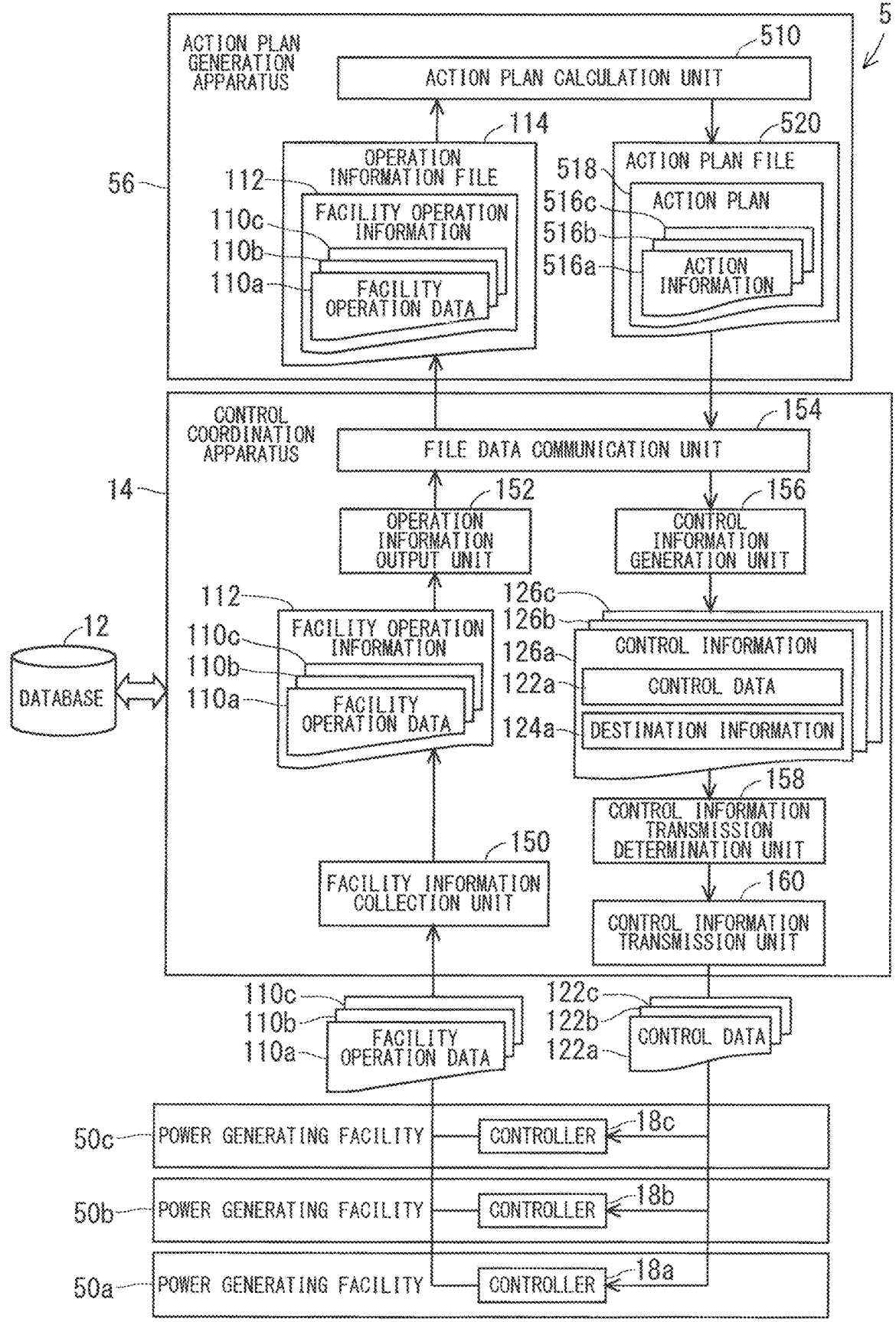
FIG. 8 is a block diagram schematically showing a power generation system in accordance with a fifth preferred embodiment.

FIG. 8 is a block diagram schematically showing a power generation system in accordance with the fifth preferred embodiment.

A power generation system 5 of the fifth preferred embodiment shown in FIG. 8 is a system for generating electricity (power).

The power generation system 5 of the fifth preferred embodiment shown in FIG. 8 is different from the production system 1 of the first preferred embodiment shown in FIG. 1 mainly in the points described below. As to points other than those described below, the same constituent elements as those adopted in the production system 1 are also adopted in the power generation system 5.

In the production system 1, the techniques on the action plan is used for production. On the other hand, in the power generation system 5, the techniques on the action plan is used for electricity generation. Accordingly, the power generation system 5 is different from the production system 1 in the points described below.

The production system 1 includes the plurality of production facilities 10a, 10b, and 10c and the action plan generation apparatus 16 including the action plan calculation unit 180. Further, the control coordination apparatus 14 included in the production system 1 is communicably connected to the plurality of production facilities 10a, 10b, and 10c and the action plan generation apparatus 16. On the other hand, the power generation system 5 includes a plurality of power generating facilities 50a, 50b, and 50c and an action plan generation apparatus 56 including an action plan calculation unit 510, instead of the plurality of production facilities 10a, 10b, and 10c and the action plan generation apparatus 16. Further, the control coordination apparatus 14 included in the power generation system 5 is communicably connected to the plurality of power generating facilities 50a, 50b, and 50c and the action plan generation apparatus 56. The power generating facilities 50a, 50b, and 50c are facilities for generating electricity.

Furthermore, the action plan generation apparatus 16 included in the production system 1 generates the action plan file 120 including the action plan 118 including the plurality of pieces of action information 116a, 116b, and 116c. On the other hand, the action plan generation apparatus 56 included in the power generation system 5 generates an action plan file 520 including an action plan 518 including a plurality of pieces of action information 516a, 516b, and 516c, instead of the action plan file 120 including the action plan 118 including the plurality of pieces of action information 116a, 116b, and 116c.

The action information 516a, 516b, and 516c are respective pieces of action information of the power generating facilities 50a, 50b, and 50c.

Further, the database 12 included in the production system 1 stores therein the plurality of pieces of facility design information 100a, 100b, and 100c and the action plan design information 102. The database 12 included in the power generation system 5 also stores therein a plurality of pieces of facility design information and action plan design information which are not shown.

The control coordination apparatus 14 collects the plurality of pieces of facility operation data 110a, 110b, and 110c from the plurality of controllers 18a, 18b, and 18c, respectively. Further, the control coordination apparatus 14 transmits the operation information file 114 including the facility operation information 112 including the plurality of pieces of facility operation data 110a, 110b, and 110c which are collected to the action plan generation apparatus 56.

The action plan generation apparatus 56 receives the transmitted operation information file 114. Further, the action plan generation apparatus 56 transmits the action plan file 520 including the action plan 518 including the action information 516a, 516b, and 516c to the control coordination apparatus 14.

The control coordination apparatus 14 receives the action plan file 520. Further, the control coordination apparatus 14 transmits the plurality of pieces of control data 122a, 122b, and 122c to the plurality of controllers 18a, 18b, and 18c, respectively, on the basis of the received action plan file 520.

Figure 9:
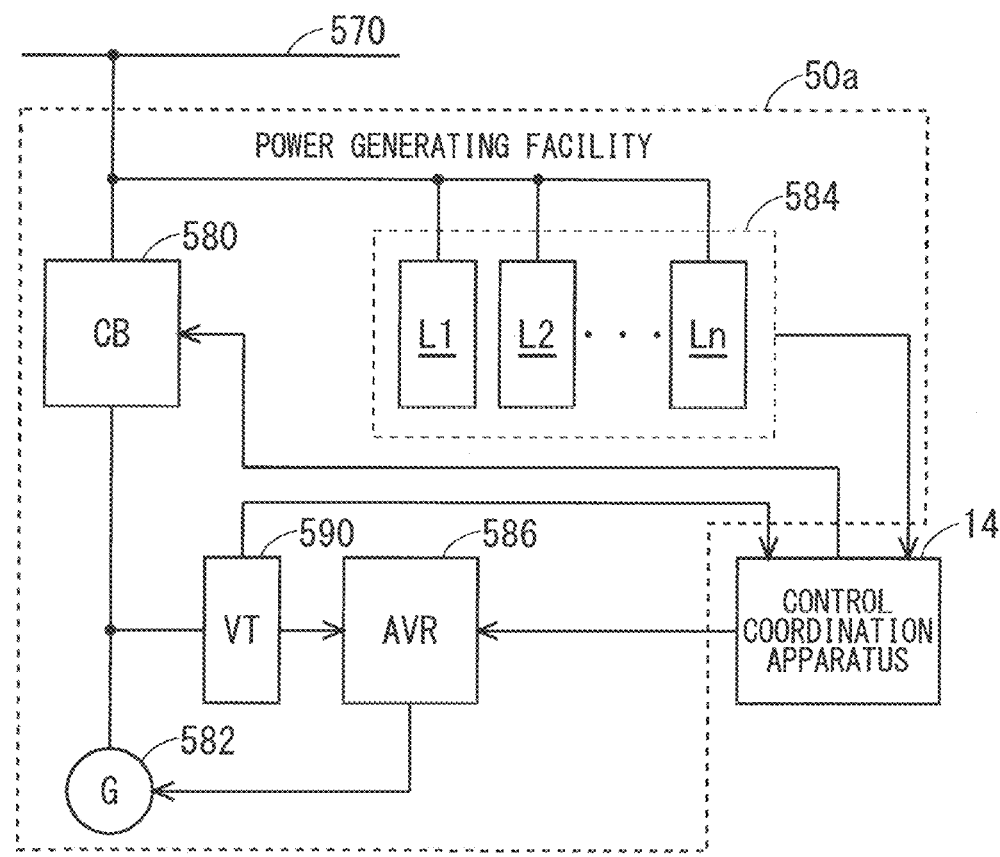
FIG. 9 is a block diagram schematically showing a power generating facility and a control coordination apparatus which are included in the power generation system in accordance with the fifth preferred embodiment.

FIG. 9 is a block diagram schematically showing the power generating facility and the control coordination apparatus which are included in the power generation system in accordance with the fifth preferred embodiment.

FIG. 9 shows only the power generating facility 50a among the power generating facilities 50a, 50b, and 50c.

The power generating facility 50a is electrically connected to a power system 570. The control coordination apparatus 14 is communicably connected to the power generating facility 50a.

The power generating facility 50a includes a plurality of equipments. In the fifth preferred embodiment, the plurality of equipments include a circuit breaker (CB) 580, an electrical generator (G) 582, an in-facility load 584, an automatic voltage regulator (AVR) 586, and a voltage detector (VT) 590. The plurality of equipments may include equipments other than these equipments. The equipment included in the plurality of equipments is an arbitrary equipment included in a plant for electricity generation such as hydroelectric power generation, thermal power generation, nuclear power generation, or the like.

The electrical generator (G) 582 is electrically connected to a power system 570 through the circuit breaker (CB) 580. The in-facility load 584 is electrically connected to the power system 570.

The in-facility load 584 consists of a plurality of loading units L1, L2, ..., and Ln, Among the plurality of loading units L1, L2, ..., and Ln, the loading unit to be put in the power system 570 changes depending on the time.

The automatic voltage regulator (AVR) 586 controls the electrical generator (G) 582 so that an output voltage of the electrical generator (G) 582, which is detected by the voltage detector (VT) 590, can follow a given voltage command value. Hereinafter, the output voltage of the electrical generator (G) 582 is referred to as a power generation voltage.

FIG. 10 is a graph showing an exemplary action plan made by the action plan generation apparatus included in the power generation system in accordance with the fifth preferred embodiment.

FIG. 10 shows a change in the power generation voltage with the elapsed time by using the graph. In the graph, the horizontal axis represents the elapsed time and the vertical axis represents the power generation voltage. The graph shows a change in an operation mode of the automatic voltage regulator (AVR) 586 with the elapsed time, a timing for turning on the circuit breaker (CB) 580, and a timing for determining to turn on the circuit breaker (CB) 580. The operation mode of the automatic voltage regulator (AVR) 586 is a normal operation mode or a voltage preadjustment operation mode.

In the fifth preferred embodiment, the action plan 518 includes the change in the power generation voltage with the elapsed time, the change in the operation mode of the automatic voltage regulator (AVR) 586 with the elapsed time, the timing for turning on the circuit breaker (CB) 580, and the timing for determining to turn on the circuit breaker (CB) 580, which are shown in FIG. 10. The action plan 518 may include information other than these information. The information included in the action plan 518 is information used for controlling the power generating facility 50a.

In the fifth preferred embodiment, the communication between each equipment included in the power generating facility 50a and the control coordination apparatus 14 is performed through the controller 18a. Further, like the case where the real-time property is required for the controller 18a which controls the plurality of production facilities 10a, the real-time property is also required for the controller 18a which controls the power generating facility 50a. Furthermore, there is a case where as the controller 18a, used is the dedicated controller in which data to be communicated are different depending on the maker which manufactures the controller or the use thereof. In this point, the same applies to the power generating facilities 50b and 50c. For this reason, there is a case where the power generation system 5 includes a plurality of dedicated controllers in which data to be communicated are different from each other. According to the fifth preferred embodiment, however, even in the case where the power generation system 5 includes the plurality of dedicated controllers in which data to be communicated are different from each other, by adopting the control coordination apparatus 14, it is possible to control the power generating facilities 50a, 50b, and 50c in accordance with the common action plan 518 without giving the function of controlling the power generating facilities 50a, 50b, and 50c in accordance with the common action plan 518 to the plurality of controllers 18a, 18b, and 18c. Further, it is possible to cause the plurality of controllers 18a, 18b, and 18c to control the power generating facilities 50a, 50b, and 50c in coordination.

6 The Sixth Preferred Embodiment

Figure 11:
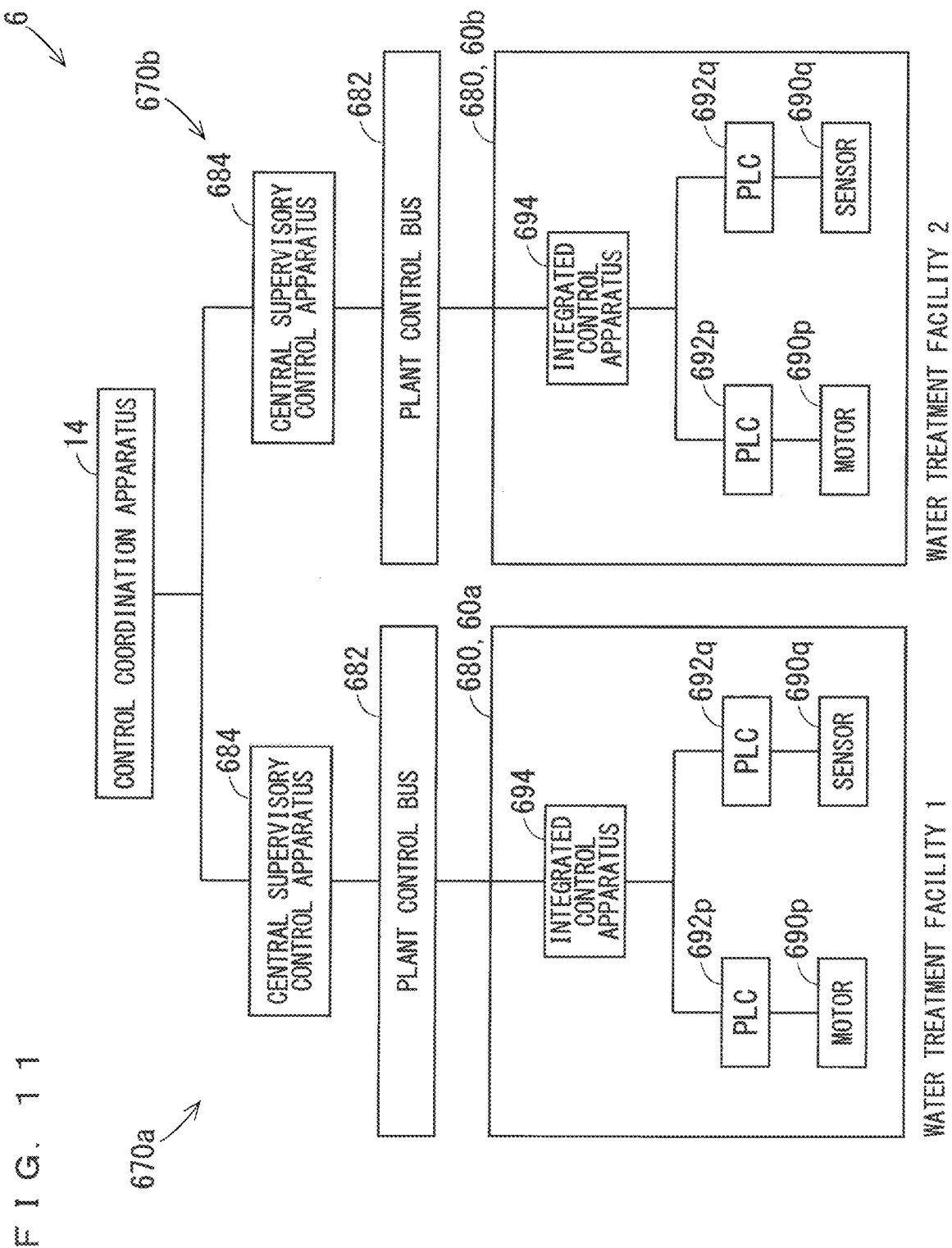
FIG. 11 is a block diagram schematically showing a water treatment system in accordance with a sixth preferred embodiment.

FIG. 11 is a block diagram schematically showing a water treatment system in accordance with the sixth preferred embodiment.

A water treatment system 6 of the sixth preferred embodiment shown in FIG. 11 is a system for performing a water treatment.

The water treatment system 6 of the sixth preferred embodiment shown in FIG. 11 is different from the production system 1 of the first preferred embodiment shown in FIG. 1 mainly in the points described below. As to points other than those described below the same constituent elements as those adopted in the production system 1 are also adopted in the water treatment system 6.

In the production system 1, the techniques on the action plan is used for production. On the other hand, in the water treatment system 6, the techniques on the action plan is used for water treatment. Accordingly, the water treatment system 6 is different from the production system 1 in the points described below.

The production system 1 includes the plurality of production facilities 10a, 10b, and 10c and the action plan generation apparatus 16 including the action plan calculation unit 180. Further, the control coordination apparatus 14 included in the production system 1 is communicably connected to the plurality of production facilities 10*a*, 10*b*, and 10*c* and the action plan generation apparatus 16. On the other hand, the water treatment system 6 includes water treatment facilities 60*a* and 60*b* and an action plan generation apparatus including an action plan calculation unit, which are not shown, instead of the plurality of production facilities 10*a*, 10*b*, and 10*c* and the action plan generation apparatus 16. Further, the control coordination apparatus 14 included in the water treatment system 6 is communicably connected to the water treatment facilities 60*a* and 60*b* and the action plan generation apparatus. The water treatment facilities 60*a* and 60*b* are facilities for performing a water treatment.

Furthermore, the action plan generation apparatus 16 included in the production system 1 generates the action plan file 120 including the action plan 118 including the plurality of pieces of action information 116*a*, 116*b*, and 116*c*. The not-shown action plan generation apparatus included in the water treatment system 6 also generates an action plan file including an action plan including action information.

The action information is action information of the water treatment facilities 60*a* and 60*b*.

Further, the database 12 included in the production system 1 stores therein the plurality of pieces of facility design information 100*a*, 100*b*, and 100*c* and the action plan design information 102. The database 12 included in the water treatment system 6 also stores therein a plurality of pieces of facility design information and action plan design information which are not shown.

As shown in FIG. 11, the water treatment system 6 includes water treatment plant systems 670*a* and 670*b* and the control coordination apparatus 14.

The water treatment plant systems 670*a* and 670*b* are operated by City A and City B, respectively.

Each of the water treatment plant systems 670*a* and 670*b* includes a water treatment facility 680, a plant control bus 682, and a central supervisory control apparatus 684.

The water treatment facility 680 includes equipments 690*p* and 690*q*, PLCs 692*p* and 692*q*, and an integrated control apparatus 694. The water treatment facility 680 includes a filtration plant, a disposal plant, and the like which are not shown, in the sixth preferred embodiment, the equipments 690*p* and 690*q* are a motor and a sensor, respectively. The equipment 690*p* may be an equipment other than the motor. The equipment 690*q* may be an equipment other than the sensor.

The PLCs 692*p* and 692*q* are communicably connected to the equipments 690*p* and 690*q*, respectively. The PLCs 692*p* and 692*q* control the equipments 690*p* and 690*q*, respectively. The PLCs 692*p* and 692*q* may be replaced by dedicated controllers other than the PLCs.

The integrated control apparatus 694 is communicably connected to the PLCs 692*p* and 692*q*. The integrated control apparatus 694 controls the PLCs 692*p* and 692*q*. The integrated control apparatus 694 is communicably connected to the central supervisory control apparatus 684 through the plant control bus 682.

The central supervisory control apparatus 684 is communicably connected to the control coordination apparatus 14 via the internet.

The maker that manufactures the PLCs 692*p* and 692*q* included in the water treatment plant system 670*b* is different from the maker which manufactures the PLCs 692*p* and 692*q* included in the water treatment plant system 670*a*. For this ea on, in a case where the water treatment system 6 does not include the control coordination apparatus 14, in order to cause the PLCs 692*p* and 692*q* to control the equipments 690*p* and 690*q* in accordance with the common action plan, the function of controlling the equipments 690*p* and 690*q* in accordance with the common action plan must be given to the PLCs 692*p* and 692*q*.

The control coordination apparatus 14 is set up in an office or the like which performs wide-area surveillance of the plurality of water treatment facilities 680. The staff or the like of the office inputs the action plan to the control coordination apparatus 14. The control coordination apparatus 14 thereby controls the plurality of water treatment facilities 680 in coordination. The action plan is, for example, a plan on the amount of clean water to be provided, which is determined on the basis of prediction on user's demand. The user's demand includes the amount of water used for morning preparation, the amount of water used for evening bathing, the amount of water used in a building during the day, the amount of water used in a plant or the like, and the like. In a case where control coordination is performed, in the control coordination apparatus 14, as described in the first preferred embodiment, the facility information collection unit 150 and the control information transmission unit 160 communicate with the PLCs 692*p* and 692*q* which control the water treatment facilities 60*a* and 60*b*, respectively, on the basis of the facility design information and the action plan design information. Further, the operation information output unit 152 and the control information generation unit 156 are adaptable to a file format communicable with the action plan calculation unit. It is thereby possible to control the plurality of water treatment facilities 680 including the equipments 690*p* and 690*q* in coordination on the basis of the inputted action plan without adding any function to the PLCs 692*p* and 692*q*.

In the sixth preferred embodiment, two central supervisory control apparatuses 684 are communicably connected to the control coordination apparatus 14. Three or more central supervisory control apparatuses 684, however, may be communicably connected to the control coordination apparatus 14. In this case, the PLCs 692*p* and 692*q* included in three or tore water treatment facilities corresponding to three or more central supervisory control apparatuses 684, respectively, are caused to perform the controls in coordination.

In the sixth preferred embodiment, two water treatment facilities 680 are operated and two central supervisory control apparatuses 684 included in the two operated water treatment facilities 680 are communicably connected to the control coordination apparatus 14. A single water treatment facility, however, may be operated. In this case, the central supervisory control apparatus included in the single water treatment facility may have the function of the control coordination apparatus. When the plurality of PLCs included in the single water treatment facility are manufactured by different makers, even in the case where the plurality of PLCs do not have the function of performing the controls in accordance with the common action plan, or the like case, it is possible to cause the plurality of PLCs to perform the controls in coordination. In other words, like in the case described in the first preferred embodiment, the facility information collection unit 150 and the control information transmission unit 160 communicate with the plurality of PLCs which control the single water treatment facility on the basis of the facility design information and the action plan design information. Further, the operation information output unit 152 and the control information generation unit 156 are adaptable to a file format communicable with the action plan calculation unit. It is thereby possible to cause the plurality of PLCs to perform the controls in coordination on the basis of the inputted action plan without adding any function to the plurality of PLCs.

Further, in the present invention, the preferred embodiments may be freely combined, or may be changed or omitted as appropriate, without departing from the scope of the invention.

While the preferred embodiments have been shown and described in detail, the foregoing description is in all aspects illustrative and not restrictive. It is therefore understood that numerous modifications and variations can be devised without departing from the scope of the invention.

EXPLANATION OF REFERENCE SIGNS 1, 2, 3, 4 production system, 5 power generation system, 6 water treatment system, 10a, 10b, 10c production facility, 12 database, 14 control coordination apparatus, 16 action plan generation apparatus, 18a, 18b, 18c controller, 50a, 50b, 50c power generating facility, 60a, 60b water treatment facility, 150 facility information collection unit, 152 operation information output unit, 154 file data communication unit, 156 control information generation unit, 158 control information transmission determination unit, 160 control information transmission unit, 180 action plan calculation unit, 200, 304, 400 control sequence management unit, 300 clock information synchronization unit, 302 pretimed signal output unit, 402 control arithmetic processing unit, 510 action plan calculation unit

The invention claimed is:

1. A control coordination system comprising:
a control coordination apparatus; and
an action plan generation apparatus, wherein
the control coordination apparatus comprises:
  a processor to execute a program, and
  a memory to store the program which, when executed by the processor, causes the processor to perform processes of:
    generating control data which includes information for specifying a control content of a facility to be controlled by a plurality of controllers and is received by each of the controllers, the control data being generated from an action plan file which includes an action plan made by the action plan generation apparatus and the action plan file being generated by the action plan generation apparatus,
    collecting facility operation data indicating an operating state of the facility from each of the controllers on the basis of facility design information including a method of communication with the facility,
    generating facility operation information including the facility operation data,
    converting the facility operation information into an operation information file readable by the action plan generation apparatus on the basis of action plan design information including information for specifying a file format readable by the action plan generation apparatus and a storage location, and
    outputting the operation information file to the storage location,
  the facility operation data is collected in accordance with communication information which is stored in a database and communicated with each of the controllers,
  the collected facility operation data coincides with requested facility operation data which are stored in the database and requested by the action plan generation apparatus,
  the action plan generation apparatus generates the action plan on the basis of facility operation information which coincides with the requested facility operation data requested by the action plan generation apparatus,
  the action plan includes the information for specifying the control content of the facility to be controlled by each of the controllers,
  the action plan file includes the information for specifying the file format and the storage location of the action plan file stored in the database, and
  the generating the control data includes converting the information for specifying the control content of the facility, which is included in the action plan, into the control data on the basis of the method of communication with the facility, which is included in the facility design information.

2. The control coordination system according to claim 1, wherein the program further causes the processor to perform processes of:
  determining whether to transmit the control data to each of the controllers, and
    transmitting the control data when the processor determines to transmit the control data to each of the controllers, or
    holding from transmitting the control data when the processor determines not to transmit the control data.

3. The control coordination system according to claim 1, wherein
  the action plan file includes execution sequence information used for managing a sequence of transmitting the control data, and
  the program further causes the processor to perform processes of:
    managing the sequence of transmitting the control data on the basis of the execution sequence information.

4. The control coordination system according to claim 3, wherein
  the execution sequence information includes a condition, and
  the program further causes the processor to perform processes of:
    determining whether the condition is satisfied or not, and
      transmitting the control data when the processor determines that the condition is satisfied, or
      holding from transmitting the control data when the processor determines that the condition is not satisfied.

5. The control coordination system according to claim 1, wherein the program further causes the processor to perform processes of:
  synchronizing clock information that the control coordination apparatus has with clock information that the facility has;
  outputting a pretimed signal having a fixed cycle in accordance with the clock information that the control coordination apparatus has; and
  managing a sequence of transmitting the control data on the basis of the pretimed signal.

6. The control coordination system according to claim 1, wherein
  the control data includes an arithmetic processing method, and the program further causes the processor to perform processes of:
 performing an arithmetic processing in accordance with the arithmetic processing method, and
 causing a result of the arithmetic processing to be included in the control data.

7. The control coordination system according to claim 1, comprising:
 the facility.

8. The control coordination system according to claim 1, wherein the action plan generation apparatus comprises:
 a second processor to execute a second program, and
 a second memory to store the second program which, when executed by the second processor, causes the processor to perform processes of:
 making the action plan on the basis of the operation information file.

9. The control coordination system according to claim 8, wherein the second program further causes the second processor to perform processes of:
 generating the action plan file so as to include a type of a parameter of a machine operation of the facility and a changed value of the parameter.

10. The control coordination system according to claim 8, wherein the second program further causes the second processor to perform processes of:
 generating the action plan file so as to include sequential control values to be transmitted to each of the controllers in a regular cycle.

\* \* \* \* \*